(12) United States Patent
Marggraff

(10) Patent No.: US 7,853,193 B2
(45) Date of Patent: Dec. 14, 2010

(54) METHOD AND DEVICE FOR AUDIBLY INSTRUCTING A USER TO INTERACT WITH A FUNCTION

(75) Inventor: James Marggraff, Lafayette, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 11/264,955

(22) Filed: Nov. 1, 2005

(65) Prior Publication Data

US 2006/0080609 A1     Apr. 13, 2006

Related U.S. Application Data

(63) Continuation-in-part of application No. 10/803,806, filed on Mar. 17, 2004, and a continuation-in-part of application No. 10/861,243, filed on Jun. 3, 2004, and a continuation-in-part of application No. 11/034,491, filed on Jan. 12, 2005.

(51) Int. Cl.
    *G09B 5/00*     (2006.01)
(52) U.S. Cl. .................. 434/317; 434/155; 345/179
(58) Field of Classification Search .............. 434/155, 434/317; 345/179; 715/863; 382/188
    See application file for complete search history.

(56) References Cited

U.S. PATENT DOCUMENTS

| | | | |
|---|---|---|---|
| 2,182,334 A | 12/1939 | Crespo | |
| 2,932,907 A | 4/1960 | Stieber et al. | |
| 3,292,489 A | 12/1966 | Johnson et al. | |
| 3,304,612 A | 2/1967 | Proctor et al. | |
| 3,530,241 A | 9/1970 | Ellis | |
| 3,591,718 A | 7/1971 | Asano | |
| 3,782,734 A | 1/1974 | Krainin | |
| 3,798,370 A | 3/1974 | Hurst | |
| 3,888,311 A | 6/1975 | Cooke, Jr. | |
| 3,911,215 A | 10/1975 | Hurst et al. | |
| 3,921,165 A | 11/1975 | Dym | |
| 4,079,194 A | 3/1978 | Kley | |
| 4,220,815 A | 9/1980 | Gibson et al. | |
| 4,337,375 A | 6/1982 | Freeman | |
| 4,375,058 A | 2/1983 | Bouma et al. | |
| 4,425,099 A | 1/1984 | Naden | |
| 4,464,118 A * | 8/1984 | Scott et al. | .............. 434/85 |
| 4,492,819 A | 1/1985 | Rodgers et al. | |

(Continued)

FOREIGN PATENT DOCUMENTS

CN     1655184     8/2005

(Continued)

OTHER PUBLICATIONS

"The Questron Electronic Wand", 2 pages; Prce, Stern, Sloan Publishers, Inc. Los Angeles.

(Continued)

*Primary Examiner*—Cameron Saadat

(57) ABSTRACT

A method for audibly instructing a user to interact with a function. A function is associated with a user-written selectable item. The user-written selectable item is recognized on a surface. In response to recognizing the user-written selectable item, a first instructional message related to the operation of the function is audibly rendered without requiring further interaction from the user.

28 Claims, 10 Drawing Sheets

U.S. PATENT DOCUMENTS

| | | | |
|---|---|---|---|
| 4,570,149 A | 2/1986 | Thornburg et al. | |
| 4,603,231 A | 7/1986 | Reiffel et al. | |
| 4,604,058 A | 8/1986 | Fisher et al. | |
| 4,604,065 A | 8/1986 | Frazer et al. | |
| 4,627,819 A | 12/1986 | Burrows | |
| 4,630,209 A | 12/1986 | Saito et al. | |
| 4,650,926 A | 3/1987 | Nakamura et al. | |
| 4,686,332 A | 8/1987 | Greanias et al. | |
| 4,706,090 A | 11/1987 | Hashiguchi et al. | |
| 4,739,299 A | 4/1988 | Eventoff et al. | |
| 4,748,318 A | 5/1988 | Bearden et al. | |
| 4,787,040 A | 11/1988 | Ames et al. | |
| 4,839,634 A | 6/1989 | More et al. | |
| 4,853,494 A | 8/1989 | Suzuki | |
| 4,853,498 A | 8/1989 | Meadows et al. | |
| 4,853,499 A | 8/1989 | Watson | |
| 4,913,463 A | 4/1990 | Tlapek et al. | |
| 4,922,061 A | 5/1990 | Meadows et al. | |
| 4,924,387 A | 5/1990 | Jeppesen | |
| 4,964,167 A | 10/1990 | Kunizawa et al. | |
| 4,990,093 A | 2/1991 | Frazer et al. | |
| 5,007,085 A | 4/1991 | Greanias et al. | |
| 5,030,117 A | 7/1991 | Delorme | |
| 5,053,585 A | 10/1991 | Yaniger | |
| 5,057,024 A | 10/1991 | Sprott et al. | |
| 5,113,178 A | 5/1992 | Yasuda et al. | |
| 5,117,071 A | 5/1992 | Greanias et al. | |
| 5,128,525 A | 7/1992 | Stearns et al. | |
| 5,149,919 A | 9/1992 | Greanias et al. | |
| 5,168,147 A | 12/1992 | Bloomberg | |
| 5,184,003 A | 2/1993 | McMillin et al. | |
| 5,194,852 A | 3/1993 | More et al. | |
| 5,217,376 A | 6/1993 | Gosselin | |
| 5,217,378 A | 6/1993 | Donovan | |
| 5,220,136 A | 6/1993 | Kent | |
| 5,220,649 A | 6/1993 | Forcier | |
| 5,221,833 A | 6/1993 | Hecht | |
| 5,250,930 A | 10/1993 | Yoshida et al. | |
| 5,301,243 A | 4/1994 | Olschafskie et al. | |
| 5,314,336 A | 5/1994 | Diamond et al. | |
| 5,401,916 A | 3/1995 | Crooks | |
| 5,417,575 A | 5/1995 | McTaggart | |
| 5,438,168 A | 8/1995 | Wolfe et al. | |
| 5,480,306 A | 1/1996 | Liu | |
| 5,484,292 A | 1/1996 | McTaggart | |
| 5,509,087 A | 4/1996 | Nagamine | |
| 5,510,606 A | 4/1996 | Worthington et al. | |
| 5,517,579 A | 5/1996 | Baron et al. | |
| 5,561,446 A | 10/1996 | Montlick | |
| 5,574,519 A | 11/1996 | Manico et al. | |
| 5,574,804 A | 11/1996 | Olschafskie et al. | |
| 5,575,659 A | 11/1996 | King et al. | |
| 5,604,517 A | 2/1997 | Filo | |
| 5,624,265 A | 4/1997 | Redford et al. | |
| 5,629,499 A | 5/1997 | Flickinger et al. | |
| 5,635,726 A | 6/1997 | Zavislan et al. | |
| 5,636,995 A | 6/1997 | Sharpe, III et al. | |
| 5,649,023 A | 7/1997 | Barbara et al. | |
| 5,652,412 A | 7/1997 | Lazzouni et al. | |
| 5,666,214 A | 9/1997 | MacKinlay et al. | |
| 5,686,705 A | 11/1997 | Conroy et al. | |
| 5,694,102 A | 12/1997 | Hecht | |
| 5,697,793 A | 12/1997 | Huffman et al. | |
| 5,698,822 A | 12/1997 | Haneda et al. | |
| 5,717,939 A | 2/1998 | Bricklin et al. | |
| 5,730,602 A * | 3/1998 | Gierhart et al. | 434/155 |
| 5,739,814 A | 4/1998 | Ohara et al. | |
| 5,757,361 A | 5/1998 | Hirshik | |
| 5,760,773 A | 6/1998 | Berman et al. | |
| 5,767,457 A | 6/1998 | Gerpheide et al. | |
| 5,788,508 A | 8/1998 | Lee et al. | |
| 5,790,114 A | 8/1998 | Geaghan et al. | |
| 5,835,726 A | 11/1998 | Shwed et al. | |
| 5,844,483 A | 12/1998 | Boley | |
| 5,847,698 A | 12/1998 | Reavey et al. | |
| 5,852,434 A | 12/1998 | Sekendur | |
| 5,855,483 A | 1/1999 | Collins et al. | |
| 5,877,458 A | 3/1999 | Flowers | |
| 5,889,506 A | 3/1999 | Lopresti et al. | |
| 5,896,403 A | 4/1999 | Nagasaki et al. | |
| 5,932,863 A | 8/1999 | Rathus et al. | |
| 5,933,829 A | 8/1999 | Durst et al. | |
| 5,960,124 A | 9/1999 | Taguchi et al. | |
| 5,963,199 A | 10/1999 | Kato et al. | |
| 5,963,208 A | 10/1999 | Dolan et al. | |
| 5,973,420 A | 10/1999 | Kaiserman et al. | |
| 5,974,558 A | 10/1999 | Cortopassi et al. | |
| 5,978,773 A | 11/1999 | Hudetz et al. | |
| 5,992,817 A | 11/1999 | Klitsner et al. | |
| 5,997,309 A | 12/1999 | Metheny et al. | |
| 6,000,613 A | 12/1999 | Hecht et al. | |
| 6,000,621 A | 12/1999 | Hecht et al. | |
| 6,008,799 A | 12/1999 | Van Kleeck | |
| 6,009,393 A | 12/1999 | Sasaki | |
| 6,018,656 A | 1/2000 | Shirai | |
| 6,020,895 A | 2/2000 | Azami | |
| 6,076,738 A | 6/2000 | Bloomberg et al. | |
| 6,088,023 A | 7/2000 | Louis et al. | |
| 6,089,943 A | 7/2000 | Lo | |
| 6,094,197 A | 7/2000 | Buxton et al. | |
| 6,104,387 A | 8/2000 | Chery et al. | |
| 6,104,388 A | 8/2000 | Nagai et al. | |
| 6,130,666 A | 10/2000 | Persidsky | |
| 6,144,371 A | 11/2000 | Clary et al. | |
| 6,164,534 A | 12/2000 | Rathus et al. | |
| 6,164,541 A | 12/2000 | Dougherty et al. | |
| 6,183,262 B1 | 2/2001 | Tseng | |
| 6,199,048 B1 | 3/2001 | Hudetz et al. | |
| 6,201,903 B1 | 3/2001 | Wolff et al. | |
| 6,201,947 B1 | 3/2001 | Hur et al. | |
| 6,208,771 B1 | 3/2001 | Jared et al. | |
| 6,215,476 B1 | 4/2001 | Depew et al. | |
| 6,215,901 B1 | 4/2001 | Schwartz | |
| 6,241,528 B1 | 6/2001 | Myers | |
| 6,262,711 B1 | 7/2001 | Cohen et al. | |
| 6,262,719 B1 | 7/2001 | Bi et al. | |
| 6,275,301 B1 | 8/2001 | Bobrow et al. | |
| 6,304,667 B1 | 10/2001 | Reitano | |
| 6,304,898 B1 | 10/2001 | Shiigi | |
| 6,304,989 B1 | 10/2001 | Kraus et al. | |
| 6,313,828 B1 | 11/2001 | Chombo | |
| 6,335,727 B1 | 1/2002 | Morishita et al. | |
| 6,349,194 B1 | 2/2002 | Nozaki et al. | |
| 6,388,681 B1 | 5/2002 | Nozaki | |
| 6,392,632 B1 | 5/2002 | Lee | |
| 6,415,108 B1 | 7/2002 | Kamishima et al. | |
| 6,416,326 B1 | 7/2002 | Oh | |
| 6,418,326 B1 | 7/2002 | Heinonen et al. | |
| 6,431,439 B1 | 8/2002 | Suer et al. | |
| 6,434,561 B1 | 8/2002 | Durst, Jr. et al. | |
| 6,442,350 B1 | 8/2002 | Stephany et al. | |
| 6,456,749 B1 | 9/2002 | Kasabach et al. | |
| 6,460,155 B1 | 10/2002 | Nagasaki et al. | |
| 6,473,072 B1 | 10/2002 | Comiskey et al. | |
| 6,476,834 B1 | 11/2002 | Doval et al. | |
| 6,502,756 B1 | 1/2003 | Fahraeus | |
| 6,509,893 B1 | 1/2003 | Akhlagi et al. | |
| 6,529,920 B1 | 3/2003 | Arons et al. | |
| 6,532,314 B1 | 3/2003 | Plain et al. | |
| 6,564,249 B2 | 5/2003 | Shiigi | |
| 6,584,249 B1 | 6/2003 | Gu et al. | |
| 6,609,653 B1 | 8/2003 | Lapstun et al. | |
| 6,628,847 B1 * | 9/2003 | Kasabach et al. | 382/314 |
| 6,641,401 B2 | 11/2003 | Wood et al. | |

| | | | |
|---|---|---|---|
| 6,644,545 B1 | 11/2003 | Lapstun et al. | |
| 6,647,369 B1 | 11/2003 | Silverbrook et al. | |
| 6,651,879 B2 | 11/2003 | Lapstun et al. | |
| 6,661,405 B1 | 12/2003 | Flowers | |
| 6,663,008 B1 | 12/2003 | Pettersson et al. | |
| 6,665,490 B2 | 12/2003 | Copperman et al. | |
| 6,668,156 B2 | 12/2003 | Lynch et al. | |
| 6,678,499 B1 | 1/2004 | Silverbrook et al. | |
| 6,689,966 B2 | 2/2004 | Wiebe | |
| 6,724,373 B1 | 4/2004 | O'Neill, Jr. et al. | |
| 6,724,374 B1 | 4/2004 | Lapstun et al. | |
| 6,738,050 B2 | 5/2004 | Comiskey et al. | |
| 6,738,053 B1 | 5/2004 | Borgstrom et al. | |
| 6,798,403 B2 | 9/2004 | Kitada et al. | |
| 6,831,632 B2 | 12/2004 | Vardi | |
| 6,847,883 B1 | 1/2005 | Walmsley et al. | |
| 6,874,883 B1 | 4/2005 | Shigemura et al. | |
| 6,885,878 B1 | 4/2005 | Borgstrom et al. | |
| 6,915,103 B2 | 7/2005 | Blume | |
| 6,938,222 B2 * | 8/2005 | Hullender et al. | 715/863 |
| 6,947,027 B2 | 9/2005 | Lapstun et al. | |
| 6,956,562 B1 | 10/2005 | O'Hara et al. | |
| 6,965,454 B1 | 11/2005 | Silverbrook et al. | |
| 6,966,495 B2 | 11/2005 | Lynggaard et al. | |
| 6,982,703 B2 | 1/2006 | Lapstun et al. | |
| 6,985,138 B2 | 1/2006 | Charlier | |
| 6,989,816 B1 | 1/2006 | Dougherty et al. | |
| 7,068,860 B2 | 6/2006 | Kasabach et al. | |
| 7,080,103 B2 | 7/2006 | Womack | |
| 7,099,019 B2 | 8/2006 | Silverbrook et al. | |
| 7,134,606 B2 | 11/2006 | Chou | |
| 7,184,592 B2 | 2/2007 | Iga et al. | |
| 7,193,618 B2 | 3/2007 | Morehouse | |
| 7,202,861 B2 | 4/2007 | Lynggaard | |
| 7,239,306 B2 | 7/2007 | Fahraeus et al. | |
| 7,289,110 B2 | 10/2007 | Hansson | |
| 7,295,193 B2 | 11/2007 | Fahraeus | |
| 7,409,089 B2 | 8/2008 | Simmons et al. | |
| 7,421,439 B2 | 9/2008 | Wang et al. | |
| 7,453,447 B2 | 11/2008 | Marggraff et al. | |
| 6,239,792 B1 | 6/2010 | Yanagisawa et al. | |
| 2001/0015721 A1 | 8/2001 | Byun et al. | |
| 2001/0024193 A1 | 9/2001 | Fahraeus | |
| 2001/0051329 A1 | 12/2001 | Lynch et al. | |
| 2002/0000468 A1 | 1/2002 | Bansal | |
| 2002/0011989 A1 | 1/2002 | Ericson et al. | |
| 2002/0023957 A1 | 2/2002 | Michaelis et al. | |
| 2002/0029146 A1 | 3/2002 | Nir | |
| 2002/0044134 A1 | 4/2002 | Ericson et al. | |
| 2002/0060665 A1 | 5/2002 | Sekiguchi et al. | |
| 2002/0077902 A1 | 6/2002 | Marcus | |
| 2002/0083101 A1 | 6/2002 | Card et al. | |
| 2002/0120854 A1 | 8/2002 | LeVine et al. | |
| 2003/0001020 A1 | 1/2003 | Kardach | |
| 2003/0013073 A1 | 1/2003 | Duncan et al. | |
| 2003/0013483 A1 | 1/2003 | Ausems et al. | |
| 2003/0014615 A1 | 1/2003 | Lynggaard | 712/220 |
| 2003/0016210 A1 | 1/2003 | Soto et al. | |
| 2003/0024975 A1 | 2/2003 | Rajasekharan | |
| 2003/0028451 A1 | 2/2003 | Ananian | |
| 2003/0040310 A1 | 2/2003 | Barakat et al. | |
| 2003/0046256 A1 | 3/2003 | Hugosson et al. | |
| 2003/0067427 A1 | 4/2003 | Comiskey et al. | |
| 2003/0089777 A1 | 5/2003 | Rajasekharan et al. | |
| 2003/0090477 A1 | 5/2003 | Lapstun et al. | |
| 2003/0095098 A1 | 5/2003 | Paul et al. | |
| 2003/0133164 A1 | 7/2003 | Tsai | |
| 2003/0134257 A1 | 7/2003 | Morsy et al. | |
| 2003/0162162 A1 * | 8/2003 | Marggraff | 434/410 |
| 2003/0173405 A1 | 9/2003 | Wilz, Sr. et al. | |
| 2003/0208410 A1 | 11/2003 | Silverbrook et al. | |
| 2004/0012198 A1 | 1/2004 | Brotzell et al. | |
| 2004/0022454 A1 | 2/2004 | Kasabach et al. | |
| 2004/0023200 A1 | 2/2004 | Blume | |
| 2004/0029092 A1 | 2/2004 | Orr et al. | |
| 2004/0043365 A1 | 3/2004 | Kelley et al. | |
| 2004/0043371 A1 | 3/2004 | Ernst et al. | |
| 2004/0084190 A1 | 5/2004 | Hill et al. | |
| 2004/0104890 A1 | 6/2004 | Caldwell et al. | |
| 2004/0169695 A1 | 9/2004 | Forman | |
| 2004/0202987 A1 | 10/2004 | Scheuring et al. | |
| 2004/0219501 A1 | 11/2004 | Small et al. | |
| 2004/0229195 A1 * | 11/2004 | Marggraff et al. | 434/169 |
| 2004/0259067 A1 | 12/2004 | Cody et al. | |
| 2005/0002053 A1 | 1/2005 | Meador et al. | |
| 2005/0013487 A1 | 1/2005 | Clary et al. | |
| 2005/0022130 A1 | 1/2005 | Fabritius | |
| 2005/0055628 A1 | 3/2005 | Chen et al. | |
| 2005/0060644 A1 | 3/2005 | Patterson | |
| 2005/0083316 A1 | 4/2005 | Brian et al. | |
| 2005/0131803 A1 | 6/2005 | Lapstun et al. | |
| 2005/0135678 A1 | 6/2005 | Wecker et al. | |
| 2005/0138541 A1 | 6/2005 | Euchner et al. | |
| 2005/0165663 A1 | 7/2005 | Razumov | |
| 2005/0188306 A1 | 8/2005 | Mackenzie | |
| 2005/0208458 A1 | 9/2005 | Smith et al. | |
| 2005/0211783 A1 | 9/2005 | Chou | |
| 2006/0033725 A1 * | 2/2006 | Marggraff et al. | 345/179 |
| 2006/0067576 A1 * | 3/2006 | Marggraff et al. | 382/186 |
| 2006/0067577 A1 * | 3/2006 | Marggraff et al. | 382/187 |
| 2006/0080609 A1 | 4/2006 | Marggraff | |
| 2006/0125805 A1 * | 6/2006 | Marggraff | 345/179 |
| 2006/0126105 A1 | 6/2006 | Sedky et al. | |
| 2006/0127872 A1 * | 6/2006 | Marggraff | 434/353 |
| 2006/0146029 A1 | 7/2006 | Diercks | |
| 2006/0159345 A1 | 7/2006 | Clary et al. | |
| 2006/0168261 A1 | 7/2006 | Serval et al. | |
| 2006/0242562 A1 | 10/2006 | Wang et al. | |
| 2006/0269168 A1 | 11/2006 | Kasabach et al. | |
| 2007/0003316 A1 | 1/2007 | Fujiwara | |

FOREIGN PATENT DOCUMENTS

| | | |
|---|---|---|
| EP | 2004/095618 A2 | 7/1992 |
| EP | 539053 | 4/1993 |
| EP | 1256090 | 11/2002 |
| EP | 1256091 B1 | 4/2004 |
| EP | 1416426 | 5/2004 |
| EP | 1315085 | 5/2005 |
| GB | 2202664 | 9/1988 |
| JP | 57-238486 | 3/1982 |
| JP | 61-46516 | 3/1986 |
| JP | 5-137846 | 6/1993 |
| JP | 5-217688 | 8/1993 |
| JP | 7296387 | 11/1995 |
| JP | 2002297308 | 10/2002 |
| JP | 2003528402 | 9/2003 |
| KR | 2002009615 | 11/2000 |
| KR | 20020033775 | 5/2002 |
| WO | 99/57648 | 11/1999 |
| WO | 00/31682 | 6/2000 |
| WO | 0072242 | 11/2000 |
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | WO 01/48590 A1 * | 7/2001 |
| WO | 01/61455 A1 | 8/2001 |
| WO | 01/71653 A1 | 9/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | 01/86612 A1 | 11/2001 |
| WO | 0183213 | 11/2001 |

| | | |
|---|---|---|
| WO | WO 01/95559 A1 | 12/2001 |
| WO | 02/42894 A1 | 5/2002 |
| WO | 03/001357 | 1/2003 |
| WO | 2003/067553 | 8/2003 |
| WO | 2004/084190 | 9/2004 |
| WO | 2004084190 | 11/2004 |

OTHER PUBLICATIONS

English Translation of Patent Abstract for JP7-296387 [Retrieved Feb. 27, 2008] Retrieved Online from {Japanese} National Center for Industrial Property Information and Training's Industrial Property Digital Library (IPDL> <URL: http://www.inipit.go.jp/PA1/result/detail/main/wAAAkaa44DA407296387P1.htm>.

Stifelman, Lisa J. Augmenting Real-World Objects: A Paper-based Audio Notebook. 1993. Speech Research Group, MIT Media Laboratory, Cambridge MA.

The Tools of Progress. [Jun. 19, 2001] [Retrieved Jun. 19, 2001] [Retrieved from the Internet] <URL:http://www.anoto.com/print_page.asp?cid=22>.

Web Page; "Scan-A-Page or Word Lets Students Hear What They're Attempting to Read!;" at URL=http://www.brighteye.com/home.htm; printed Mar. 13, 2003; 1 page.

Web Page; "What Works: Optical Scanner Pens;" at URL=http://newsletters.fen.com/whatworks/items/front/0,2551,1-13751-3366-3,00.html; printed Mar. 13, 2003; 2 pages.

Steve Silberman, "The Hot New Medium: Paper", Apr. 2001, Wired, Issue 9.04.

Web Page; "Scan-A-Page or Word Lets Students Hear What They're Attempting to Read!;" at URL=http://www.brighteye.com/home.htm;printed Mar. 13, 2003; 1 page (Leap 163.01).

Web page; "What Works; Optical Scanner Pens;" at URL=http://newsletters.fen.com/whatworks/item/front/0,2551,1-13751-3363,00.html; printed Mar. 13, 2003; 2 pages. (124DIVCON2).

British Micro, "Operating Guide to Grafpad", 1982, 28 pp.

Kramer, Translucent Patches-Dissolving Windows;, Nov. 2, 1994 Symposium on user interface software and technology, pp. 121-130, XP001979943 (124DIVCON2).

Robertson G.G et al; "Button as First Class Objects on an X Desktop", Nov. 11, 1991, UIST '91 4th Annual Symposium on user interface software and technology. Proceedings of the ACM Symposium on user interface and technology. Hilton Head, SC, Nov. 11-13, 1991, ACM symposium on user interface software and technology, NewYo, pp. 35-44, XP000315064 (124DIVCON2).

Stifelman, Lisa J. Augmenting Real-World Objects: A Paper-Based Audio Notebook. 1993. Speech Research Group. MIT Media Laboratory, Cambridge MA. (124DIVCON2).

The Tools of Progress. [Jun. 19, 2001] [Retrieved Jun. 19, 2001] [Retrieved from the Internet] <URL:http://www.anoto.com/print_page.asp?cid=22> (124DIVCON2).

"New Preschool Toys From Fisher-Price Give a Voice to Fun, Creativity and Interactive Play This Holiday Season", Mattel, Inc.; Investor Releations, http://www.shareholder.com/mattel/news/20000601-43282.cfm, 3pp., Jun. 2000.

* cited by examiner

METHOD AND DEVICE FOR AUDIBLY INSTRUCTING A USER TO INTERACT WITH A FUNCTION

CROSS-REFERENCE TO RELATED APPLICATION

This Application is a Continuation-in-Part of the co-pending, commonly-owned U.S. patent application Ser. No. 10/803,806, filed Mar. 17, 2004, by James Marggraff et al., entitled "SCANNING APPARATUS," and hereby incorporated by reference herein in its entirety.

This Application is a Continuation-in-Part of the co-pending, commonly-owned U.S. patent application Ser. No. 10/861,243, filed Jun. 3, 2004, by James Marggraff et al., entitled "USER CREATED INTERACTIVE INTERFACE," and hereby incorporated by reference herein in its entirety.

This application is a Continuation-in-Part of the co-pending, commonly-owned U.S. patent application Ser. No. 11/034,491 filed Jan. 12, 2005, by James Marggraff et al., entitled "A METHOD AND SYSTEM FOR IMPLEMENTING A USER INTERFACE FOR A DEVICE EMPLOYING WRITTEN GRAPHICAL ELEMENTS," and hereby incorporated by reference herein in its entirety.

This application is related to co-pending, commonly-owned U.S. patent application Ser. No. 11/035,155 filed Jan. 12, 2005, by James Marggraff et al., entitled "A METHOD AND SYSTEM FOR IMPLEMENTING A USER INTERFACE FOR A DEVICE THROUGH RECOGNIZED TEXT AND BOUNDED AREAS," and hereby incorporated by reference herein in its entirety.

This application is related to co-pending, commonly-owned U.S. patent application Ser. No. 11/035,003 filed Jan. 12, 2005, by James Marggraff et al., entitled "TERMINATION EVENTS," and hereby incorporated herein in its entirety.

FIELD OF INVENTION

Embodiments of the present invention relate to the field of interactive devices. More specifically, embodiments of the present invention relate to a pen-based interactive device.

BACKGROUND OF THE INVENTION

Devices such as optical readers or optical pens conventionally emit light that reflects off a surface to a detector or imager. As the device is moved relative to the surface (or vice versa), successive images are rapidly captured. By analyzing the images, movement of the optical device relative to the surface can be tracked.

One type of optical pen is used with a sheet of paper on which very small dots are printed. The dots are printed on the page in a pattern with a nominal spacing of about 0.3 millimeters (0.01 inches). The pattern of dots within any region on the page is unique to that region. The optical pen essentially takes a snapshot of the surface, perhaps 100 times a second or more. By interpreting the dot positions captured in each snapshot, the optical pen can precisely determine its position relative to the page.

Applications that utilize information about the position of an optical pen relative to a surface have been or are being devised. An optical pen with Bluetooth or other wireless capability can be linked to other devices and used for sending electronic mail (e-mail) or faxes.

The increasing power of embedded computer systems and the complexity of the functions they are able to implement have created a need for a more intuitive and user-friendly manner of accessing such power. A typical prior art optical pen will implement its intended functionality by the user operating one or more buttons/switches or controls of the optical pen to activate one or more software programs, routines, embedded devices, or the like. The pen may contain or be in communication with a computer system. Upon actuation of such controls, the pen device performs its intended function. Accessing the capabilities of increasingly powerful optical pens through the limited number and configuration of switches, buttons, etc. provided on the pen itself, or any remotely coupled computer system device, is not a satisfactory arrangement.

One prior art solution uses the optical pen to recognize a user-defined command, and uses that command to invoke some function of the pen (e.g., PCT publication WO/01/48590 A1). For example, a user's writing can be recognized (e.g., in real-time) and interpreted as a command for the optical pen. The drawback with this solution involves the fact that interaction and control of the functions of the pen requires real-time recognition of the user's handwriting (e.g., as the user writes the command down on a sheet of paper). This solution is not satisfactory due to the fact that interaction with more complex functionality of an optical pen requires the user to repeatedly write-down one or more commands to access different choices, options, or functions provided by the pen. While the solution might be satisfactory for exceedingly simple, single step type applications (e.g., "turn off", "store", etc.), the solution is overly cumbersome and limiting in those cases where more complex, satisfying, rich functionality is desired.

SUMMARY OF THE INVENTION

Accordingly, a need exists for an interactive device that provides an efficient user interface for interacting with functions associated with user-written selectable items. A need also exists for an interactive device that satisfies the above need and provides audible instruction to a user that assists in enabling interaction with the function. A need also exists for an interactive device that satisfies the first need and provides automatic execution of particular functions without first requiring additional user interaction.

Various embodiments of the present invention, a method for audibly instructing a user to interact with a function, are described herein. A function is associated with a user-written selectable item. The user-written selectable item is recognized on a surface. In one embodiment the recognizing the user-written selectable item is performed in response to detecting a termination event indicating that the user-written selectable item is complete. In one embodiment, recognizing the user-written selectable item includes optically recording positions of the tip of a pen computer and performing image recognition of the positions to recognize the user-written selectable item.

In response to the recognizing the user-written selectable item, a first instructional message related to the operation of the function is audibly rendered without requiring further interaction from the user. In one embodiment, the first instructional message directs the user to draw at least one user interface element that enables the user to interface with the function.

In one embodiment, the function is executed prior to audibly rendering the first instructional message. In one embodiment, audibly rendering the first instructional message is performed by an audio output device of a pen computer.

In one embodiment, it is determined whether a writing has been drawn on the surface within a predetermined time period since the first instructional message was audibly rendered. Provided no writing has been drawn on the surface within the predetermined time period, the first instructional message is repeated.

In one embodiment, it is determined whether the user interface element has been properly drawn on the surface. Provided the user interface element has not been properly drawn on the surface, a second instructional message comprising a hint about a manner in which the user should properly draw the user interface element is audibly rendered. In one embodiment, provided the user interface element has been properly drawn, a third instructional message is audibly rendered. In another embodiment, provided the user interface element has been properly drawn, the function is executed. In one embodiment, in response to a user interaction with the user-written selectable item, the first instructional message is repeated.

In another embodiment, the present invention provides an interactive device including a bus, a processor, a memory unit, an audio output device, a writing element, and an optical detector that is operable to implement the described method for audibly instructing a user to interact with a function. In another embodiment, the present invention provides a computer-usable medium having computer-readable program code embodied therein for causing a computer system to perform the described method for audibly instructing a user to interact with a function.

In other various embodiments described herein, the present invention provides a method for automatically executing a function. A function is associated with a user-written selectable item. The user-written selectable item is recognized on a surface. In one embodiment the recognizing the user-written selectable item is performed in response to detecting a termination event indicating that the user-written selectable item is complete.

In response to the recognizing the user-written selectable item, the function is immediately executed without first requiring further interaction between a user and the surface. In one embodiment, the function is immediately executed without first requiring auxiliary writing by the user on the surface.

In one embodiment, an instructional message related to the operation of the function is audibly rendered without first requiring further interaction between the user and the surface. In one embodiment, the instructional message is audibly rendered in response to the lapsing of a predetermined time period without user interaction with the surface. In one embodiment, in response to a user interaction with the user-written selectable item, the function is re-executed.

In another embodiment, the present invention provides an interactive device including a bus, a processor, a memory unit, an audio output device, a writing element, and an optical detector that is operable to implement the described method for automatically executing a function. In another embodiment, the present invention provides a computer-usable medium having computer-readable program code embodied therein for causing a computer system to perform the described method for automatically executing a function.

In the various embodiments, the user-written selectable item includes one of: a symbol representation of an application program executable by the processor, a menu item of an application program executable by the processor, a navigation item, a data, an application option selector, or another selectable item.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
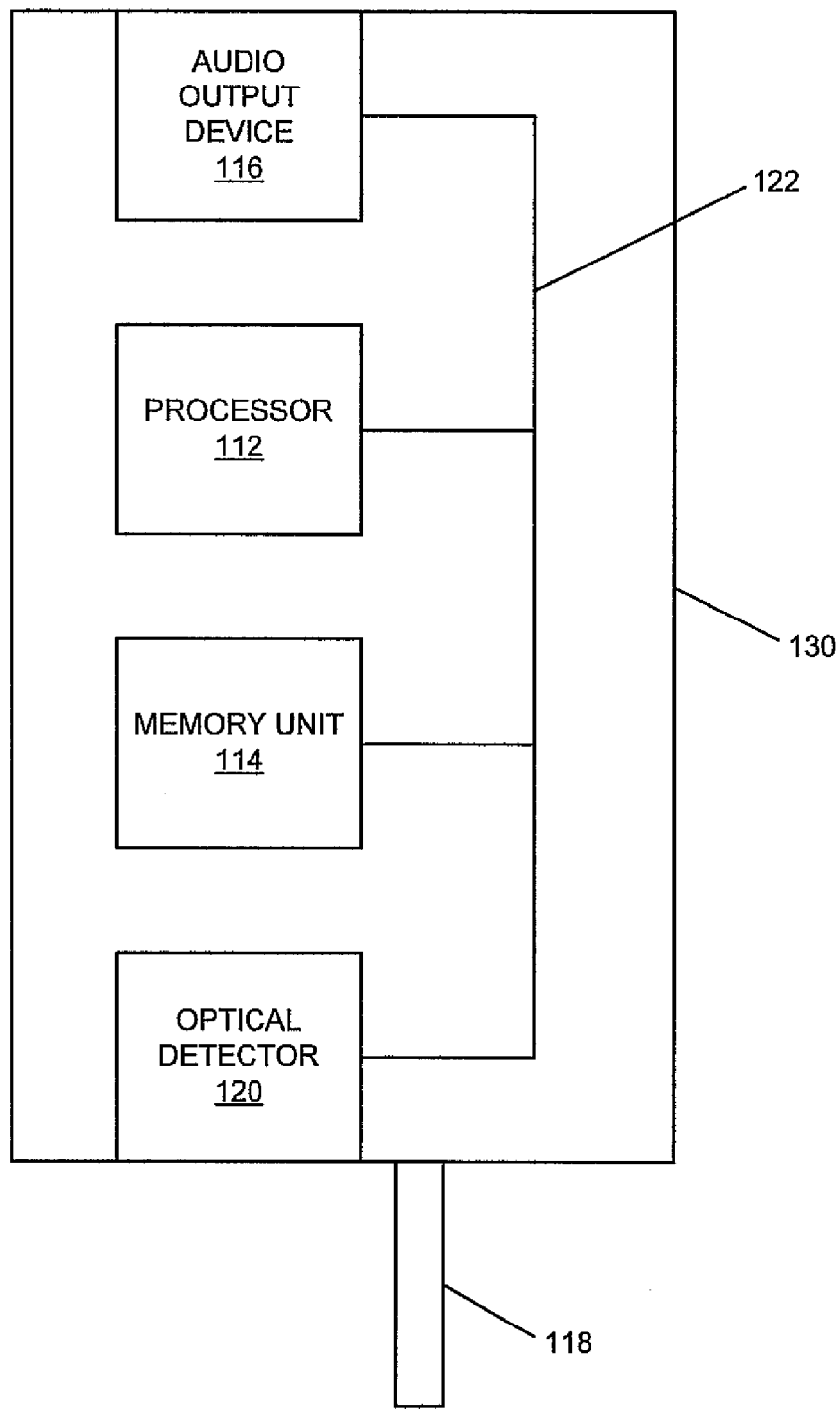
FIG. 1 illustrates an interactive device in accordance with an embodiment of the present invention.

Reference will now be made in detail to various embodiments of the invention, an interactive device that allows a user to create and interact with selectable items written on a surface, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "associating" or "recognizing" or "rendering" or "requiring" or "determining" or "repeating" or "executing" or "detecting" or "directing" or the like, refer to the action and processes of an electronic system (e.g., interactive device 100 of FIG. 1), or similar electronic computing device, that manipulates and transforms data represented as physical (electronic) quantities within the electronic device's registers and memories into other data similarly represented as physical quantities within the electronic device memories or registers or other such information storage, transmission or display devices.

EMBODIMENTS OF THE INVENTION

Various embodiments of the present invention, a method and device for audibly instructing a user to interact with a function, are described herein. In one embodiment, the described embodiments are implemented within an interactive device that allows a user to create and interact with selectable items written on a surface. The present invention provides a user with an interface that replaces an electronic display with any writable surface, such as a piece of paper. The user may create user-written selectable items on the surface that execute associated functions and/or represent user-written data, e.g., words, characters, numbers, symbols, etc. The user-written selectable items are persistent on the surface, allowing a user to execute functions associated with different selectable items throughout operation of the interactive device. In one embodiment, in response to recognizing a particular user-written selectable item as being associated with a particular function, the interactive device audibly renders an instructional message related to the operation of the function. In another embodiment, in another embodiment, in response to recognizing a particular user-written selectable item as being associated with a particular function, the interactive device immediately executes the function.

FIG. 1 illustrates an interactive device 100 in accordance with an embodiment of the present invention. Interactive device 100 includes processor 112, memory unit 114, audio output device 116, writing element 118 and optical detector 120 within housing 130. In one embodiment, processor 112, memory unit 114, audio output device 116 and optical detector 120 are communicatively coupled over bus 122.

In one embodiment, housing 130 is shaped in the form of a stylus or a writing instrument (e.g., pen-like). A user may hold interactive device 100 in a similar manner as a stylus is held. Writing element 118 is located at one end of housing 130 such that a user can place writing element 118 in contact with a writable surface (not shown). Writing element 118 may include a pen, a pencil, a marker, a crayon, or any other marking material. It should be appreciated that writing element 118 may also include a non-marking tip. During use, a user can hold interactive device 100 and use it in a similar manner as a writing instrument to write on a surface, such as paper.

Writing element 118 may be used to create user-written selectable items on the surface. A "user-written selectable item" may include any marking created by the user. If a marking is made on a surface (e.g., a sheet of paper), the user-written selectable item may be a print element. User-written selectable item include, but are not limited to symbols, indicia such as letters and/or numbers, characters, words, shapes, lines, etc. They can be regular or irregular in shape, and they are typically created using the stylus.

Interactive device 100 allows users to create user-written selectable items that represent different functions provided by interactive device 100. In one embodiment, the user-written selectable item includes a symbol representation of an application program executable by processor 112 (e.g., a calculator application or a dictionary application). In another embodiment, the user-written selectable item may include a navigation item (e.g., a menu), a menu item of an application program executable by said processor, an application option selector, or an instance of data (e.g., a word).

In some embodiments, the user-written selectable item can include a letter or number with a line circumscribing the letter or number. The line circumscribing the letter or number may be a circle, oval, square, polygon, etc. Such user-written selectable items appear to be like "buttons" that can be selected by the user, instead of ordinary letters and numbers. By creating a user-written selectable item of this kind, the user can visually distinguish user-written selectable items such as functional icons from ordinary letters and numbers. Also, by creating user-written selectable items of this kind, interactive device 100 may also be able to better distinguish functional or menu item type user-written selectable items from non-functional or non-menu item type user-written items. For instance, a user may create a user-written selectable item that is the letter "M" which has a circle around it to create an interactive "menu" icon. The interactive device 100 may be programmed to recognize an overlapping circle or square with the letter "M" in it as a functional user-written selectable item as distinguished from the letter "M" in a word. Computer code for recognizing such functional user-written selectable items and distinguishing them from other non-functional user-written items can reside in memory unit 114 in interactive device 100.

In another embodiment, the described user-written selectable items may include multiple characters, such as the letters "FT" which have a circle around it to create an interactive musical keyboard icon. In other embodiments, the described user-written selectable items may include multiple functions. For example, the letter "T" within a circle that represents a time function and the letter "D" within a circle that represents a date function may both be within a larger circle. This larger circle represents a user-written selectable item whereby a user interacting with the larger circle initiates execution of both the time function and the date function.

Figure 2B:
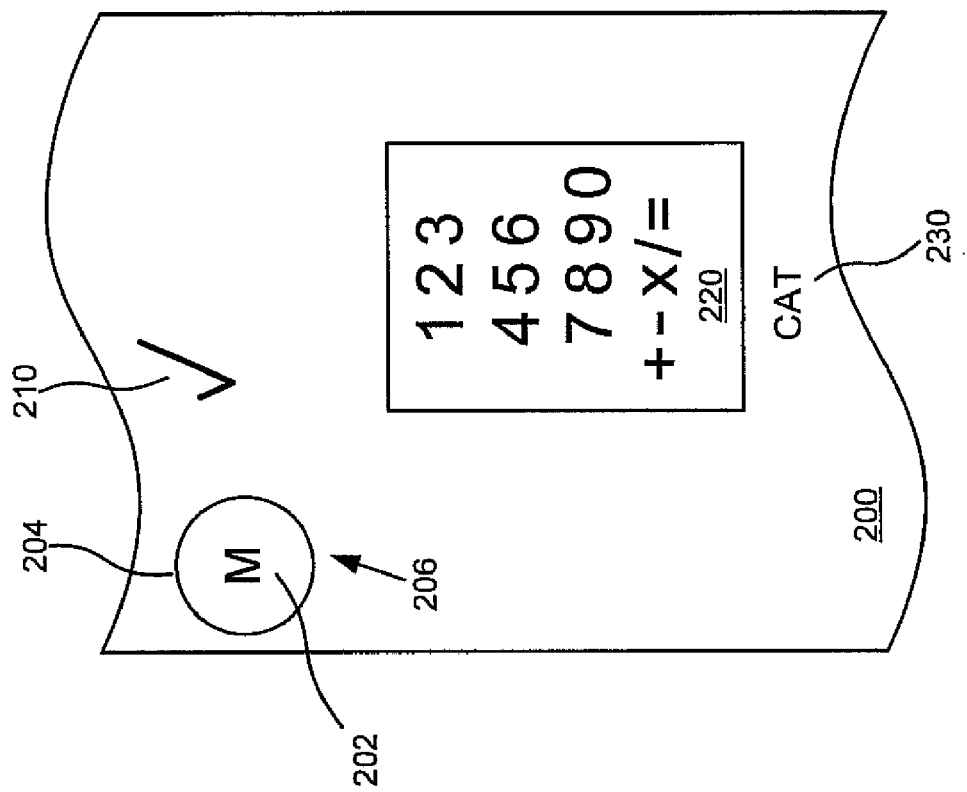
FIGS. 2A through 2D illustrate exemplary user-written selectable items on a sheet of paper, in accordance with embodiments of the present invention.
Figure 2A:
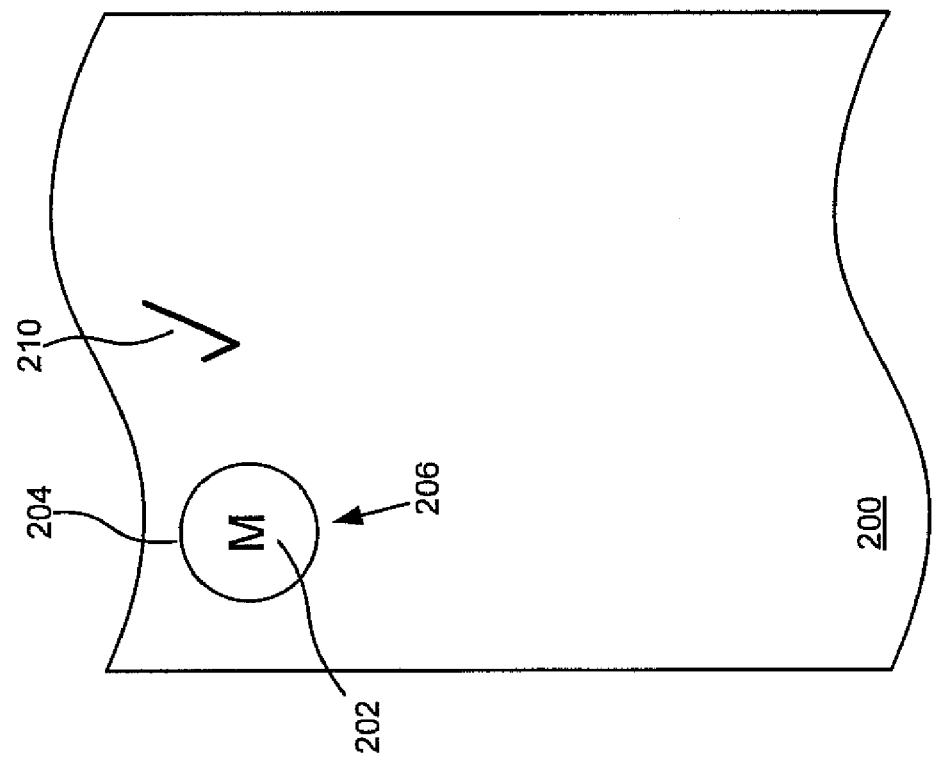

FIGS. 2A through 2D illustrate exemplary user-written selectable items on a sheet of paper, in accordance with embodiments of the present invention. With reference to FIG. 2A, user-written selectable element 206 is the letter "M" 202 with the circle 204 around the letter "M" 202. User-written selectable item 206 is drawn on sheet 200 with a writing element of an interactive device (e.g., writing element 118 of FIG. 1).

In one embodiment, user-written selectable item 206 represents a menu function of the interactive device. To indicate a selection of a particular menu item, directory, or subdirectory, a user may create another user-written selectable item or make a gesture with the interactive device 100. For example, if the user wants to proceed down a subdirectory of the menu, the user may then draw a check mark 210 on sheet 200 to indicate that a selection has been made. After drawing the checkmark, the menu items associated with user-written selectable item 206 may be audibly rendered by audio output device 116, after each subsequent selection or "down-touch" of the interactive device 100 onto the sheet 200 near user-written selectable item 206. Interaction with the checkmark 210 then selects the last option that was audibly rendered. For example, a "calculator" function could then be selected after the user hears the word "calculator" recited to change the mode of operation of the interactive device 100 to the calculator function FIG. 2B shows how a user can create a paper calculator on a blank portion of sheet 200. In this example, after the user has selected the "calculator" function as described above, interactive device 100 audibly prompts the user to write down the numbers 0-9 and the operators +, −, ×/, and =. For example, a user may be prompted to create the user-written selectable items 220 including numbers and mathematical operators for operations such as addition, subtraction, multiplication, division, and equals. These are hard drawn on the surface. Interactive device 100 recognizes the positions of the created graphic elements and recognizes the actual user-written selectable items created. A user can then select at least two user-written selectable items to receive an audio output related to the selection of those at least two graphic elements. For example, the user may select sequence of graphic elements "4" "+" "7" "=" to hear the interactive apparatus 100 recite the result "eleven."

The menu represented by user-written selectable item 206 and the paper calculator represented by user-written selectable item 220 can be re-used at a later time, since interactive device 100 has stored the locations of the user-written selectable items in memory unit 114. Also, an interaction of the pen with user-written selectable item 220 will automatically invoke the calculator function.

FIG. 2B also includes data 230. In the example shown in FIG. 2B, data 230 is the word "CAT". It should be appreciated that data 230 can be any information (e.g., alphanumeric symbol, image, drawing, marking, etc.) that may be used by an application operating on interactive device 100. When written, the text string, CAT, is automatically recognized as the word cat. Its location on the surface is also recorded. Interaction of interactive device 100 with this text string automatically recalls the identified word CAT.

Figure 2D:
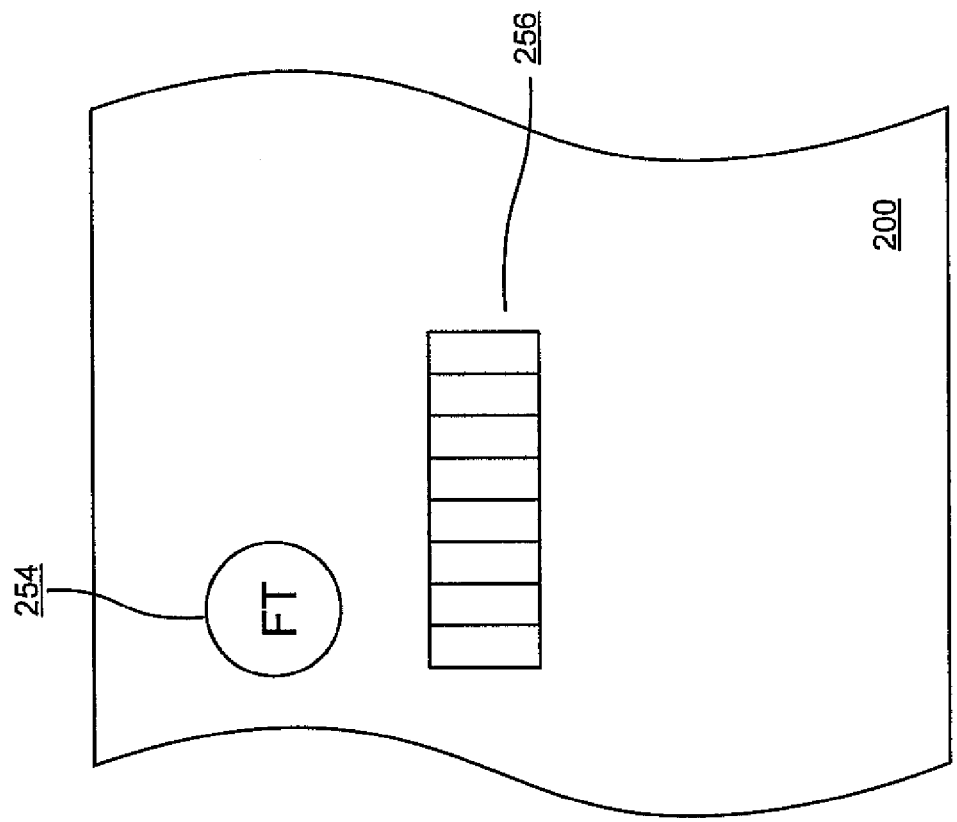
Figure 2C:
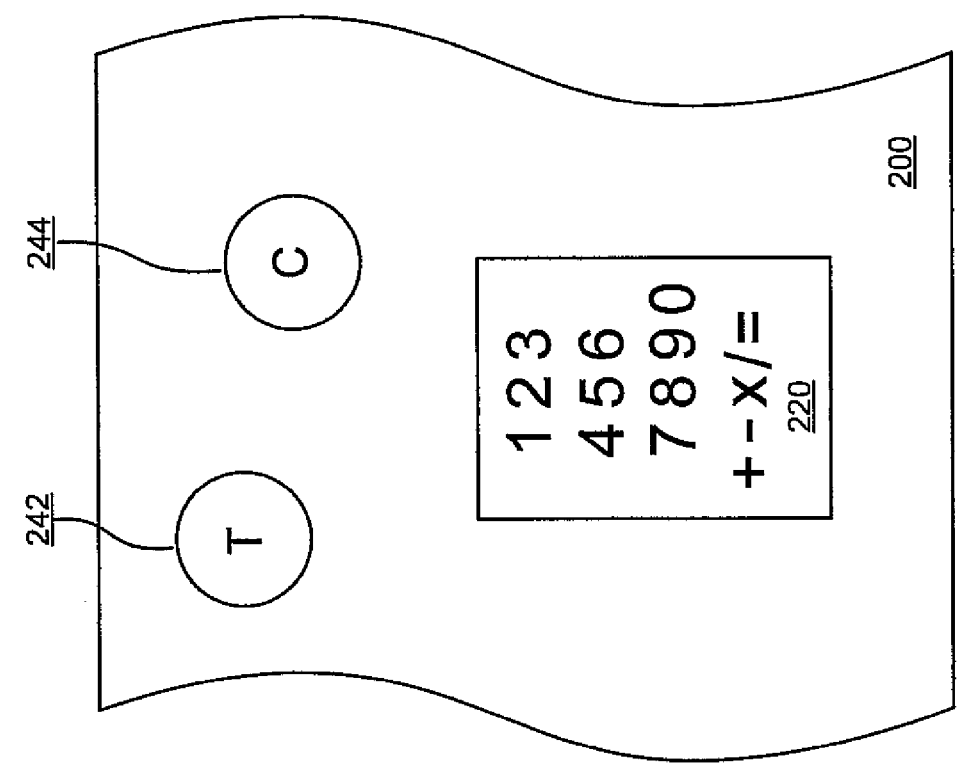

With reference to FIG. 2C, user-written selectable element 242 is the letter "T" with a circle drawn around the letter "T". User-written selectable item 242 is drawn on sheet 200 with a writing element of an interactive device (e.g., writing element 118 of FIG. 1). In one embodiment, user-written selectable item 242 represents a time function of the interactive device. Executing the time function causes the interactive device to audibly render the current time. In one embodiment, the interactive device may also audibly render the current date.

In one embodiment, once user-written selectable element 242 has been drawn, the associated time function is immediately executed without requiring further interaction between the user and sheet 200. For example, the time function may be immediately executed without requiring a user to draw any auxiliary writing (e.g., a checkmark) on sheet 200 once user-written selectable element 242 has been recognized. It should be appreciated that in some embodiments, an auxiliary writing may be provided by a user to provide the functionality described above in accordance with the description of checkmark 210, but that it is not necessary. For instance, it may be desirable to immediately execute a function without requiring additional user interaction to optimize the user experience.

Still with reference to FIG. 2C, user-written selectable element 244 is the letter "C" with a circle drawn around the letter "C". User-written selectable item 244 is drawn on sheet 200 with a writing element of an interactive device (e.g., writing element 118 of FIG. 1). In one embodiment, user-written selectable item 244 represents the calculator function of the interactive device as described in accordance with FIG. 2B (e.g., user-written selectable items 220).

In one embodiment, once user-written selectable element 244 has been drawn, an instructional message related to the operation of the calculator function is audibly rendered without requiring further interaction between the user and sheet 200. For example, once user-written selectable element 244 has been recognized, an instructional message directing a user to draw a calculator, or a portion thereof, is audibly rendered without requiring a user to draw any auxiliary writing (e.g., a checkmark) on sheet 200. As described above, it should be appreciated that in some embodiments, an auxiliary writing may be provided by a user to provide the functionality described above in accordance with the description of checkmark 210, but it is not necessary. For instance, it may be desirable to provide instruction to a user as to the use of a function without requiring additional user interaction to optimize the user experience.

With reference to FIG. 2D, user-written selectable element 254 is the letters "FT" with a circle drawn around the letters "FT". User-written selectable item 254 is drawn on sheet 200 with a writing element of an interactive device (e.g., writing element 118 of FIG. 1). In one embodiment, user-written selectable item 254 represents a musical keyboard function of the interactive device.

In one embodiment, once user-written selectable element 254 has been drawn, an instructional message related to the operation of the musical keyboard function is audibly rendered without requiring further interaction between the user and sheet 200. For example, once user-written selectable element 254 has been recognized, an instructional message directing a user to draw a keyboard 256, or a portion thereof, is audibly rendered without requiring a user to draw any auxiliary writing (e.g., a checkmark) on sheet 200.

Optical detector 120 is atone end of the stylus-shaped interactive device 100. Optical detector 120 is operable to detect information on the surface. For example, optical detector 120 may comprise a charge coupled device. In one embodiment, interactive device also comprises an optical emitter for illuminating a portion of the surface that is detected by optical detector 120. The information detected by optical detector 120 is transmitted to processor 112.

Processor 112 may include any suitable electronics to implement the functions of the interactive device 100. Processor 112 can recognize the user-written selectable items and can identify the locations of those user-written selectable items so that interactive device 100 can perform various operations. In these embodiments, memory unit 114 may comprise computer code for correlating any user-written selectable items produced by the user with their locations on the surface.

Memory unit 114 comprises computer code for performing any of the functions of the interactive device 100. In one embodiment, wherein computer code stored in memory unit 114 and implemented on processor 112 is responsive to a user selection of a user-written selectable item and operable to execute a function associated with the user-written selectable item in response to the selection. In another embodiment, computer code stored in memory unit 114 and implemented on processor 112 is operable to direct audio output device 116 to audibly render a listing of potential user-written selectable items, wherein processor 112 is operable to detect that a user has written a plurality of user-written selectable items, and wherein processor 112 responsive to a user selection of one or more user-written selectable items of the plurality of user-written selectable items is operable to execute a different function associated with each of the selected user-written selectable items.

In one embodiment, processor 112 is operable to automatically identify a user-written selectable item in response to a selection using symbol recognition or character recognition. In another embodiment, processor 112 is operable to automatically record a surface location of a user-written selectable item on the surface when it is written. Processor 112 is operable to automatically identify the user-written selectable item in response to a user selection based on a detected surface location of the user-written selectable item.

In one embodiment, the present invention provides an operating system of interactive device 100. The operating system is operable to detect a user-written selectable item on a surface, associate the user-written selectable item with a function, and, responsive to a user interaction with the user-written selectable item, executing the associated function.

In other embodiments, memory unit 114 may comprise computer code for recognizing printed characters, computer code for recognizing a user's handwriting and interpreting the user's handwriting (e.g., handwriting character recognition software), computer code for correlating positions on an article with respective print elements, code for converting text to speech (e.g., a text to speech engine), computer code for reciting menu items, computer code for performing translations of language (English-to-foreign language dictionaries), etc. Software for converting text to speech is commercially available from a number of different vendors.

Memory unit 114 may also comprise code for audio and visual outputs. For example, code for sound effects, code for saying words, code for lesson plans and instruction, code for questions, etc. may all be stored in memory unit 114. Code for audio outputs such as these may be stored in a non-volatile memory (in a permanent or semi-permanent manner so that the data is retained even if the interactive apparatus is turned off), rather than on the article itself. Computer code for these and other functions described in the application can be included in memory unit 114, and can be created using any suitable programming language including C, C++, etc.

Memory unit 114 may be a removable memory unit such as a ROM or flash memory cartridge. In other embodiments, memory unit 114 may comprise one or more memory units (e.g., RAM, ROM, EEPROM, etc.). Memory unit 114 may comprise any suitable magnetic, electronic, electromagnetic, optical or electro-optical data storage device. For example, one or more semiconductor-based devices can be in memory unit 114.

Audio output device 116 may include a speaker or an audio jack (e.g., and ear piece or headphone jack) for coupling to an ear piece or a headset. In one embodiment, audio output device 116 is operable to audibly render a list of potential user-written selectable items. Audio output device 116 may also be operable to audibly render information in response to a user selection of a user-written selectable item.

It should be appreciated that interactive device 100 is also operable to recognize and execute functions associated with pre-printed selectable items on the surface. In one embodiment, responsive to a user selection of a pre-printed selectable item on the surface, processor 112 is operable to execute a function associated with a pre-printed selectable item in response to a user selecting the pre-printed selectable item. In one embodiment, processor 112 is operable to automatically identify a pre-printed selectable using symbol recognition. In another embodiment, processor 112 is operable to automatically identify the pre-printed selectable item based on a detected surface location of the pre-printed selectable item. Moreover, in another embodiment, processor 112 is operable identify an application program based on a particular bounded region of the surface, such that different bounded regions are associated with different application programs.

Figure 3:
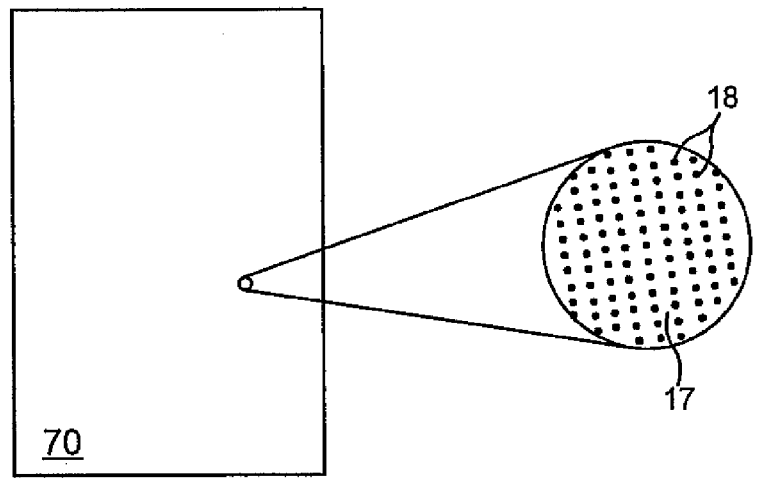
FIG. 3 shows an exemplary sheet of paper provided with a pattern of marks according to one embodiment of the present invention.

In some embodiments, the surface can be a sheet of paper with or without pre-printed selectable items. FIG. 3 shows a sheet of paper 15 provided with a pattern of marks according to one embodiment of the present invention. In the embodiment of FIG. 3, sheet of paper 15 is provided with a coding pattern in the form of optically readable position code 17 that consists of a pattern of marks 18. The marks 18 in FIG. 3 are greatly enlarged for the sake of clarity. In actuality, the marks 18 may not be easily discernible by the human visual system, and may appear as gray scale on sheet of paper 15. In one embodiment, the marks 18 are embodied as dots; however, the present invention is not so limited.

Figure 4:
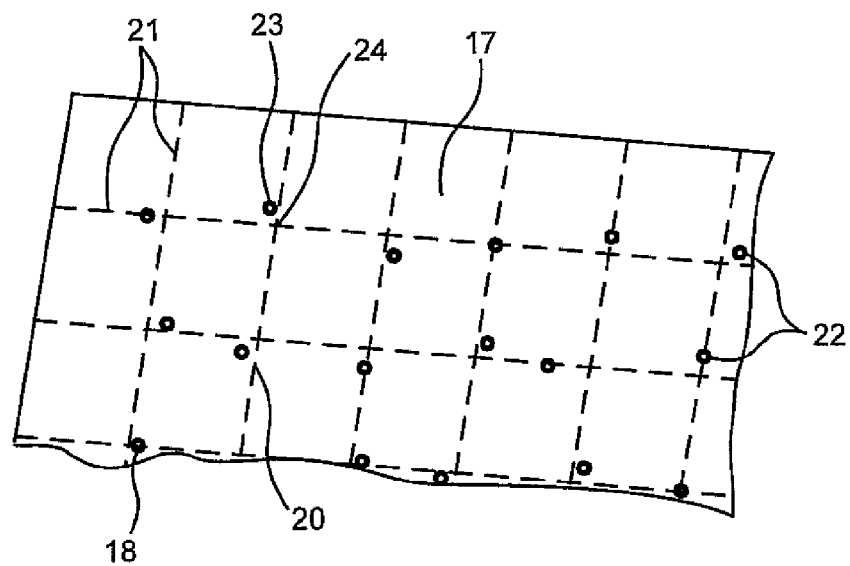
FIG. 4 shows an enlargement of a pattern of marks on an exemplary sheet of paper according to one embodiment of the present invention.

FIG. 4 shows an enlarged portion 19 of the position code 17 of FIG. 3. An interactive device such as interactive device 100 (FIG. 1) is positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the surface 70. Thus, by matching the pattern in the image/raster with a pattern in the reference system, the position of the pattern on the surface 70, and hence the position of the optical device relative to the surface 70, can be determined.

In one embodiment, the pattern of marks on sheet 15 are substantially invisible codes. The codes are "substantially invisible" to the eye of the user and may correspond to the absolute or relative locations of the selectable items on the page. "Substantially invisible" also includes codes that are completely or slightly invisible to the user's eye. For example, if dot codes that are slightly invisible to the eye of a user are printed all over a sheet of paper, the sheet may appear to have a light gray shade when viewed at a normal viewing distance. In some cases, after the user scans the codes with interactive device 100, audio output device 116 in interactive device 100 produces unique audio outputs (as opposed to indiscriminate audio outputs like beeping sounds) corresponding to user-written selectable items that are associated with the codes.

In one embodiment, the substantially invisible codes are embodied by dot patterns. Technologies that read visible or "subliminally" printed dot patterns exist and are commercially available. These printed dot patterns are substantially invisible to the eye of the user so that the codes that are present in the dot patterns are undetectable by the user's eyes in normal use (unlike normal bar codes). The dot patterns can be embodied by, for example, specific combinations of small and large dots that can represent ones and zeros as in a binary coding. The dot patterns can be printed with ink that is different than the ink that is used to print the print elements, so that interactive device 100 can specifically read the dot patterns.

Anoto, a Swedish company, employs a technology that uses an algorithm to generate a pattern the enables a very large unique data space for non-conflicting use across a large set of documents. Their pattern, if fully printed, would cover 70 trillion 8.5"×11" pages with unique recognition of any 2 cm square on any page. Paper containing the specific dot patterns is commercially available from Anoto. The following patents and patent applications are assigned to Anoto and describe this basic technology and are all herein incorporated by reference in their entirety for all purposes: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

In some embodiments, the dot patterns may be free of other types of data such as data representing markers for data blocks, audio data, and/or error detection data. As noted above, processor 112 in interactive device 100 can determine the location of the stylus using a lookup table, and audio can be retrieved and played based on the location information. This has advantages. For example, compared to paper that has data for markers, audio, and error detection printed on it, embodiments of the invention need fewer dots, since data for markers, audio, and error detection need not be printed on the paper. By omitting, for example, audio data from a piece of paper, more space on the paper can be rendered interactive, since actual audio data need not occupy space on the paper. In addition, since computer code for audio is stored in interactive device 100 in embodiments of the invention, it is less likely that the audio that is produced will be corrupted or altered by, for example, a crinkle or tear in the sheet of paper.

It should be appreciated that although dot patterned codes are specifically described herein, other types of substantially invisible codes may be used in other embodiments of the invention. For example, infrared bar codes could be used if the bar codes are disposed in an array on an article. Illustratively, a sheet of paper may include a 100×100 array of substantially invisible bar codes, each code associated with a different x-y position on the sheet of paper. The relative or absolute locations of the bar codes in the array may be stored in memory unit 114 in interactive device 100.

As noted, in some embodiments, the substantially invisible codes may directly or indirectly relate to the locations of the plurality of positions and/or any selectable items on the sheet. In some embodiments, the substantially invisible codes can directly relate to the locations of the plurality of positions on a sheet (or other surface). In these embodiments, the locations of the different positions on the sheet may be provided by the codes themselves. For example, a first code at a first position may include code for the spatial coordinates (e.g., a particular x-y position) for the first position on the sheet, while a second code at a second position may code for the spatial coordinates of the second position on the sheet.

Different user-written selectable items can be at the different positions on the sheet. These user-written selectable items may be formed over the codes. For example, a first user-written selectable item can be formed at the first position overlapping the first code. A second user-written selectable item can be formed at the second position overlapping the second code. When a user forms the first user-written selectable item, the scanning apparatus recognizes the formed first print element and substantially simultaneously scans the first code that is associated with the formed first user-written selectable item. Processor 112 in interactive device 100 can determine the particular spatial coordinates of the first position and can correlate the first user-written selectable item with the spatial coordinates.

When the user forms the second user-written selectable item, the scanning apparatus recognizes the formed second user-written selectable item and substantially simultaneously scans the second code. Processor 112 can then determine the spatial coordinates of the second position and can correlate the second user-written selectable item with the spatial coordinates. A user can then subsequently select the first and second user-written selectable items using interactive device 100, and interactive device 100 can perform additional operations. For example, using this methodology, a user can create a user-defined interface or a functional device on a blank sheet of paper.

Interactive device 100 may also include a mechanism that maps or correlates relative or absolute locations with the formed user-written selectable items in memory unit 114. The mechanism can be a lookup table that correlates data related to specific user-written selectable items on the article to particular locations on an article. This lookup table can be stored in memory unit 114. Processor 112 can use the lookup table to identify user-written selectable items at specific locations so that processor 112 can perform subsequent operations.

The surface with the substantially invisible codes can be in any suitable form. For example, the surface may be a single sheet of paper, a note pad, filler paper, a poster, a placard, a menu, a sticker, a tab, product packaging, a box, a trading card, a magnet (e.g., refrigerator magnets), a white board, a table top, etc. Moreover, the surface may be comprised of any material, including but not limited to paper, wood, metal, plastic, etc. Any of these or other types of surfaces can be used with or without pre-printed selectable items. If the surface is a sheet, the sheet can be of any suitable size and can be made of any suitable material. For example, the sheet may be paper based, or may be a plastic film. In some embodiments, the surface may be a three-dimensional article with a three-dimensional surface. The three-dimensional surface may include a molded figure of a human body, animals (e.g., dinosaurs), vehicles, characters, or other figures.

In some embodiments, the surface is a sheet and the sheet may be free of pre-printed selectable elements such as printed letters or numbers (e.g., markings made before the user creates user-written selectable items on the sheet). In other embodiments, pre-printed selectable items can be on the sheet (e.g., before the user creates user-written selectable items on the sheet). Pre-printed print elements can include numbers, icons, letters, circles, words, symbols, lines, etc. For example, embodiments of the invention can utilize pre-printed forms such as pre-printed order forms or voting ballots.

Interactive device 100 can be in any suitable form, in one embodiment, interactive device 100 is a scanning apparatus that is shaped as a stylus. In one embodiment, interactive device 100 is pocket-sized. The stylus includes a stylus housing that can be made from plastic or metal. A gripping region may be present on the stylus housing.

Figure 5:
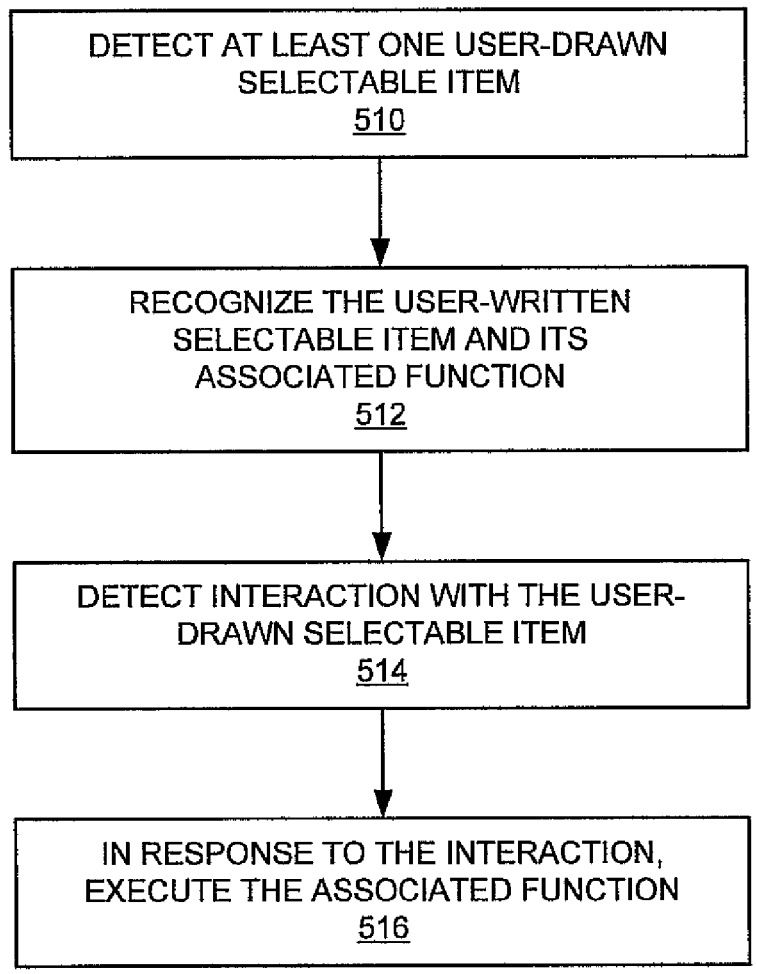
FIG. 5 shows a flowchart of the steps of a process for facilitating interaction with user-written selectable items on a surface in accordance with one embodiment of the present invention.

FIG. 5 shows a flowchart of the steps of a process 500 for facilitating interaction with user-written selectable items on a surface in accordance with one embodiment of the present invention. Process 500 depicts the basic operating steps of a user interface process as implemented by an interactive device (e.g., interactive device 100) in accordance with one embodiment of the present invention as it interprets user input in the form of user-written selectable items, graphic elements, writing, marks, etc. and provides the requested functionality to the user.

At step 510, where the computer implemented functionality of the device 100 detects a user-written selectable item on a writable surface. At step 512, the user-written selectable item is recognized along with the function of the user-written selectable item. This function can be, for example, a menu function that can enunciate a predetermined list of functions (e.g., menu choices) for subsequent activation by the user. At step 514, interaction with the user-written selectable item is detected. The interaction may include writing the user-written selectable item, interacting with the user-written selectable item with the interactive device (e.g., tapping the user-written selectable item), or interacting with a related user-written selectable item (e.g., checkmark 210 of FIG. 2B). The function is persistently associated with the user-written selectable item, enabling a subsequent access of the function (e.g., at some later time) by a subsequent interaction (e.g., tapping) of the graphical element icon. For example, in the case of a menu function, the listed menu choices can be subsequently accessed by the user at some later time by simply actuating the menu graphic element icon (e.g., tapping it).

In this manner, embodiments of the present invention implement a user interface means for navigating the functionality of an interactive device (e.g., interactive device 100 of FIG. 1) using a pen and paper type interface. The user interface as implemented by the user-written selectable items provides the method of interacting with a number of software applications that execute within interactive device 100. As described above, the input to interactive device 100 includes user actions, such as a user creating a user-written selectable item or a user interacting with a user-written or pre-printed selectable item. The output from the pen is audio output, and thus, the user interface means enables the user to carry on a "dialog" with the applications and functionality of the pen. In other words, the user interface enables the user to create mutually recognized items such as user-written selectable items on a surface that allow the user and the pen to interact with one another. As described above, the mutually recognized items are typically symbols or marks or icons that the user draws on a surface, such as a sheet of paper.

ADDITIONAL EMBODIMENTS OF THE INVENTION

Figure 6:
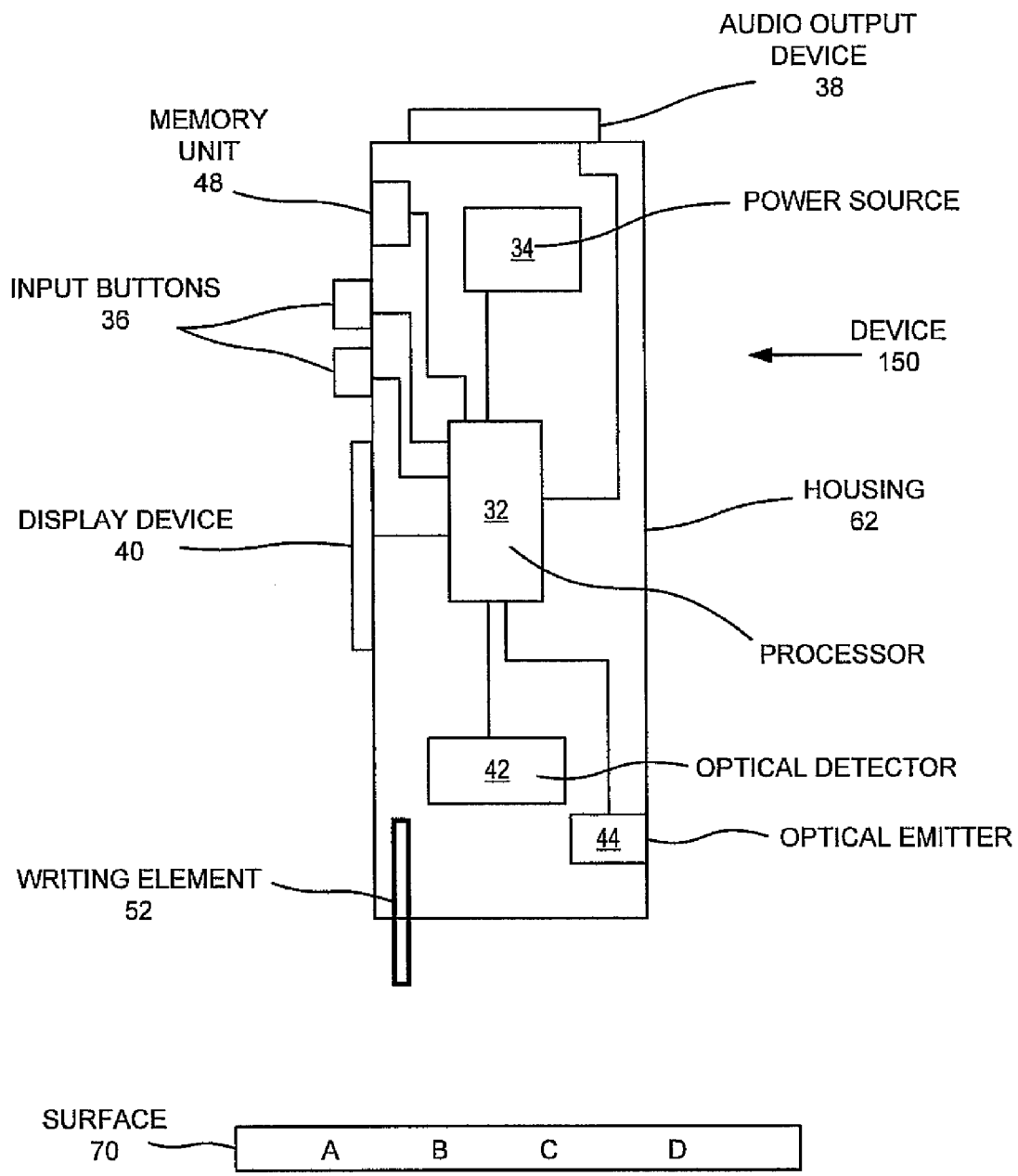
FIG. 6 is a block diagram of another device upon which embodiments of the present invention can be implemented.

FIG. 6 is a block diagram of a pen device 150 upon which other embodiments of the present invention can be implemented. In general, pen device 150 may be referred to as an optical device, more specifically as an optical reader, optical pen or digital pen. The device may contain a computer system and an operating system resident thereon. Application programs may also reside thereon.

In the embodiment of FIG. 6, pen device 150 includes a processor 32 inside a housing 62. In one embodiment, housing 62 has the form of a pen or other writing or marking utensil or instrument. Processor 32 is operable for processing information and instructions used to implement the functions of pen device 150, which are described below.

In the present embodiment, the pen device 150 may include an audio output device 36 and a display device 40 coupled to the processor 32. In other embodiments, the audio output device and/or the display device are physically separated from pen device 150, but in communication with pen device 150 through either a wired or wireless connection. For wireless communication, pen device 150 can include a transceiver or transmitter (not shown in FIG. 6). The audio output device 36 may include a speaker or an audio jack (e.g., for an earphone or headphone). The display device 40 may be a liquid crystal display (LCD) or some other suitable type of display.

In the embodiment of FIG. 6, pen device 150 may include input buttons 38 coupled to the processor 32 for activating and controlling the pen device 150. For example, the input buttons 38 allow a user to input information and commands to pen device 150 or to turn pen device 150 on or off. Pen device 150 also includes a power source 34 such as a battery.

Pen device 150 also includes a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 is received at and recorded by optical detector 42.

The surface 70 may be a sheet a paper, although the present invention is not so limited. For example, the surface 70 may be an LCD (liquid crystal display, CRT (cathode ray tube), touch screen, or other similar type of active electronic surface (e.g., the display of a laptop or tablet PC). Similarly, the surface 70 can be a surface comprising electronic ink, or a surface comprising reconfigurable paper.

In one embodiment, a pattern of markings is printed on surface 70. The end of pen device 150 that holds optical emitter 44 and optical detector 42 is placed against or near surface 70. As pen device 150 is moved relative to the surface 70, the pattern of markings are read and recorded by optical emitter 44 and optical detector 42. As discussed in more detail above, in one embodiment, the markings on surface 70 are used to determine the position of pen device 150 relative to surface (see FIGS. 3 and 4). In another embodiment, the markings on surface 70 are used to encode information (see FIGS. 8 and 9). The captured images of surface 70 can be analyzed (processed) by pen device 150 to decode the markings and recover the encoded information.

Additional descriptions regarding surface markings for encoding information and the reading/recording of such markings by electronic devices can be found in the following patents and patent applications that are assigned to Anoto and that are all herein incorporated by reference in their entirety: U.S. Pat. No. 6,502,756, U.S. application Ser. No. 10/179, 966, filed on Jun. 26, 2002, WO 01/95559, WO 01/71473, WO 01/75723, WO 01/26032, WO 01/75780, WO 01/01670, WO 01/75773, WO 01/71475, WO 10 00/73983, and WO 01116691.

Pen device 150 of FIG. 6 also includes a memory unit 48 coupled to the processor 32. In one embodiment, memory unit 48 is a removable memory unit embodied as a memory cartridge or a memory card. In another embodiment, memory unit 48 includes random access (volatile) memory (RAM) and read-only (non-volatile) memory (ROM) for storing information and instructions for processor 32.

In the embodiment of FIG. 6, pen device 150 includes a writing element 52 situated at the same end of pen device 150 as the optical detector 42 and the optical emitter 44. Writing element 52 can be, for example, a pen, pencil, marker or the like, and may or may not be retractable. In certain applications, writing element 52 is not needed. In other applications, a user can use writing element 52 to make marks (e.g., graphical elements or user-written selectable items) on surface 70, including characters such as letters, words, numbers, mathematical symbols and the like. These marks can be scanned (imaged) and interpreted by pen device 150 according to their position on the surface 70. The position of the user-produced marks can be determined using a pattern of marks that are printed on surface 70; refer to the discussion of FIGS. 3 and 4, above. In one embodiment, the user-produced markings can be interpreted by pen device 150 using optical character recognition (OCR) techniques that recognize handwritten characters.

As mentioned above, surface 70 may be any surface suitable on which to write, such as, for example, a sheet of paper, although surfaces consisting of materials other than paper may be used. Also, surface 70 may or may not be flat. For example, surface 70 may be embodied as the surface of a globe. Furthermore, surface 70 may be smaller or larger than a conventional (e.g., 8.5×11 inch) page of paper.

Figure 7:
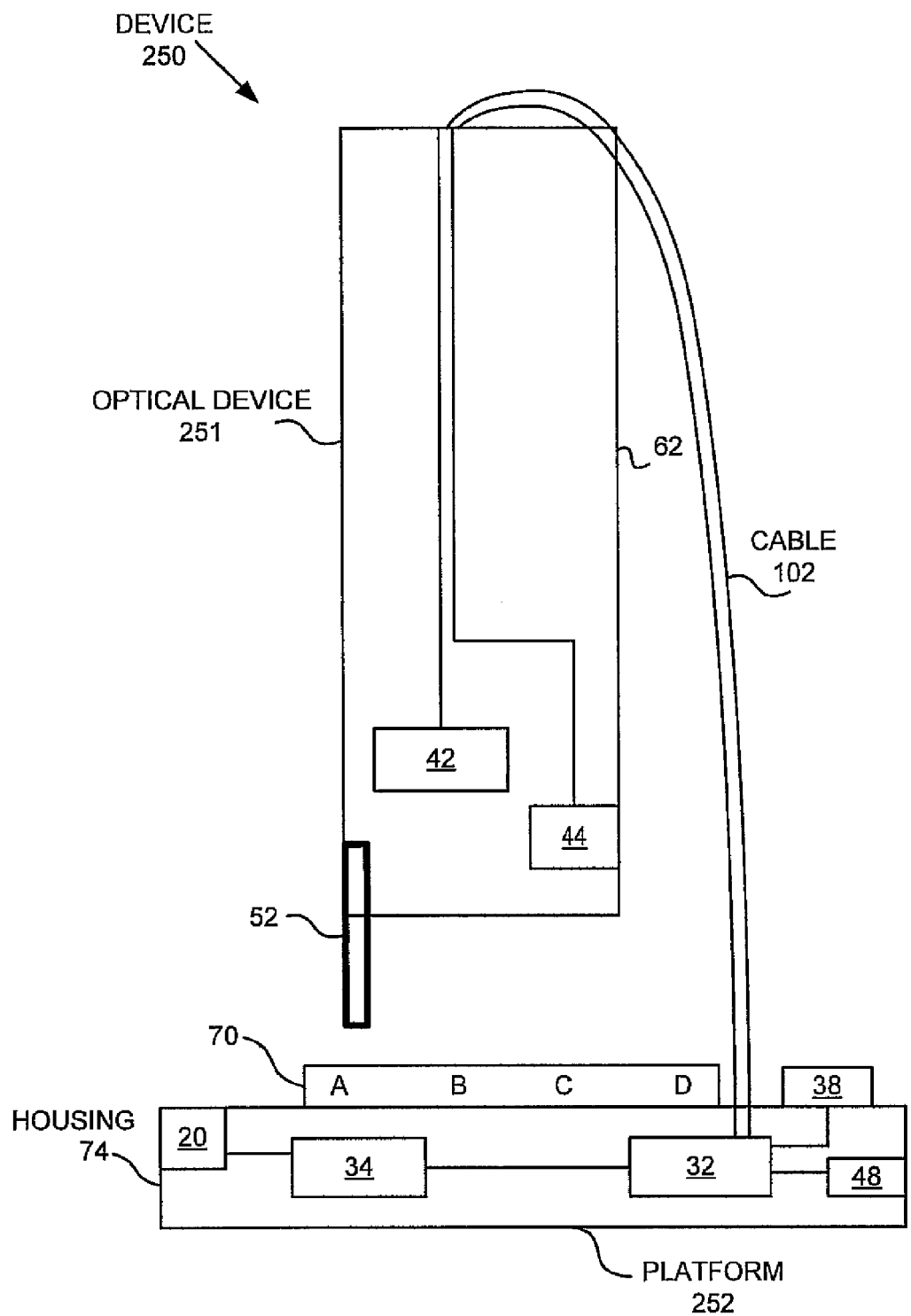
FIG. 7 is a block diagram of another device upon which embodiments of the present invention can be implemented.

FIG. 7 is a block diagram of another device 250 upon which embodiments of the present invention can be implemented. Device 250 includes processor 32, power source 34, audio output device 36, input buttons 38, memory unit 48, optical detector 42, optical emitter 44 and writing element 52, previously described herein. However, in the embodiment of FIG. 7, optical detector 42, optical emitter 44 and writing element 52 are embodied as optical device 251 in housing 62, and processor 32, power source 34, audio output device 36, input buttons 38 and memory unit 48 are embodied as platform 202 in housing 74. In the present embodiment, optical device 251 is coupled to platform 252 by a cable 102; however, a wireless connection can be used instead. The elements illustrated by FIG. 7 can be distributed between optical device 251 and platform 252 in combinations other than those described above.

With reference back to FIG. 6, four positions or regions on surface 70 are indicated by the letters A, B, C and D (these characters are not printed on surface 70, but are used herein to indicate positions on surface 70). There may be many such regions on the surface 70. Associated with each region on surface 70 is a unique pattern of marks. The regions on surface 70 may overlap because even if some marks are shared between overlapping regions, the pattern of marks in a region is still unique to that region.

In the example of FIG. 6, using pen device 150 (specifically, using writing element 52), a user may create a character consisting, for example, of a circled letter "M" at position A on surface 70 (generally, the user may create the character at any position on surface 70). The user may create such a character in response to a prompt (e.g., an audible prompt) from pen device 150. When the user creates the character, pen device 150 records the pattern of markings that are uniquely present at the position where the character is created. The pen device 150 associates that pattern of markings with the character just created. When pen device 150 is subsequently positioned over the circled "M," pen device 150 recognizes the pattern of marks associated therewith and recognizes the position as being associated with a circled "M." In effect, pen device 150 recognizes the character using the pattern of markings at the position where the character is located, rather than by recognizing the character itself.

In one embodiment, the characters described above comprise "graphic elements" that are associated with one or more commands of the pen device 150. It should be noted that such graphic elements that are associated with, and are used to access the pen device 150 implemented functions comprising commands, are referred to as "graphic element icons" hereafter in order to distinguish from other written characters, marks, etc. that are not associated with accessing functions or applications of the pen device 150. In the example just described, a user can create (write) a graphic element icon that identifies a particular command, and can invoke that command repeatedly by simply positioning pen device 150 over the graphic element icon (e.g., the written character). In one embodiment, the writing instrument is positioned over the graphical character. In other words, the user does not have to write the character for a command each time the command is to be invoked by the pen device 150; instead, the user can write the graphic element icon for a command one time and invoke the command repeatedly using the same written graphic element icon. This attribute is referred to as "persistence" and is described in greater detail below. This is also true regarding graphical element icons that are not user written but pre-printed on the surface and are nevertheless selectable by the pen device 150.

In one embodiment, the graphic element icons can include a letter or number with a line circumscribing the letter or number. The line circumscribing the letter or number may be a circle, oval, square, polygon, etc. Such graphic elements appear to be like "buttons" that can be selected by the user, instead of ordinary letters and numbers. By creating a graphic element icon of this kind, the user can visually distinguish graphic element icons such as functional icons from ordinary letters and numbers, which may be treated as data by the pen device 150. Also, by creating graphic element icons of this kind, the pen device may also be able to better distinguish functional or menu item type graphic elements from non-functional or non-menu item type graphic elements. For instance, a user may create a graphic element icon that is the letter "M" which is enclosed by a circle to create an interactive "menu" graphic element icon.

The pen device 150 may be programmed to recognize an overlapping circle or square with the letter "M" in it as a functional graphic element as distinguished from the letter "M" in a word. The graphic element icon may also include a small "check mark" symbol adjacent thereto, within a certain distance (e.g., 1 inch, 1.5 inches, etc.). The checkmark will be associated with the graphic element icon. Computer code for recognizing such functional graphic elements and distinguishing them from other non-functional graphic elements can reside in the memory unit in the pen device. The processor can recognize the graphic element icons and can identify the locations of those graphic element icons so that the pen device 150 can perform various functions, operations, and the like associated therewith. In these embodiments, the memory unit may comprise computer code for correlating any graphic elements produced by the user with their locations on the surface. The pen device 150 recognizes a "down-touch" or "down-stroke" or being placed down upon the surface (e.g., when the user begins writing) and recognizes an "up-stroke" or being picked up from the surface (e.g., when the user finishes writing). Such down-strokes and up-strokes can be interpreted by the pen device 150 as, for example, indicators as to when certain functionality is invoked and what particular function/application is invoked (e.g., triggering OCR processing). Particularly, a down-stroke quickly followed by an up-stroke (e.g., a tap of the pen device on the surface) can be associated with a special action depending upon the application (e.g., selecting a graphic element icon, text string, etc.).

It should be noted that the generic term "graphic element" may include any suitable marking created by the user (e.g., a user-written selectable item), and is distinguishable from a graphic element icon which refers to a functional graphic element that is used to access one or more functions of the device.

As mentioned above, it should be noted that graphic element icons can be created by the pen device 150 (e.g., drawn by the user) or can be pre-existing (e.g., a printed element on a sheet of paper). Example graphic elements include, but are not limited to symbols, indicia such as letters and/or numbers, characters, words, shapes, lines, etc. They can be regular or irregular in shape. User written/created graphic elements are typically created using the pen device 150. Additionally, graphic element icons usually, but not always, incorporate a circumscribing line (e.g., circle) around a character (e.g., the letter "M") to give them an added degree of distinctiveness to both the user and the pen device 150. For example, in one embodiment, an up-stroke after finishing a circle around the character can specifically indicate to the pen device 150 that the user has just created a graphic element icon.

Figure 8A:
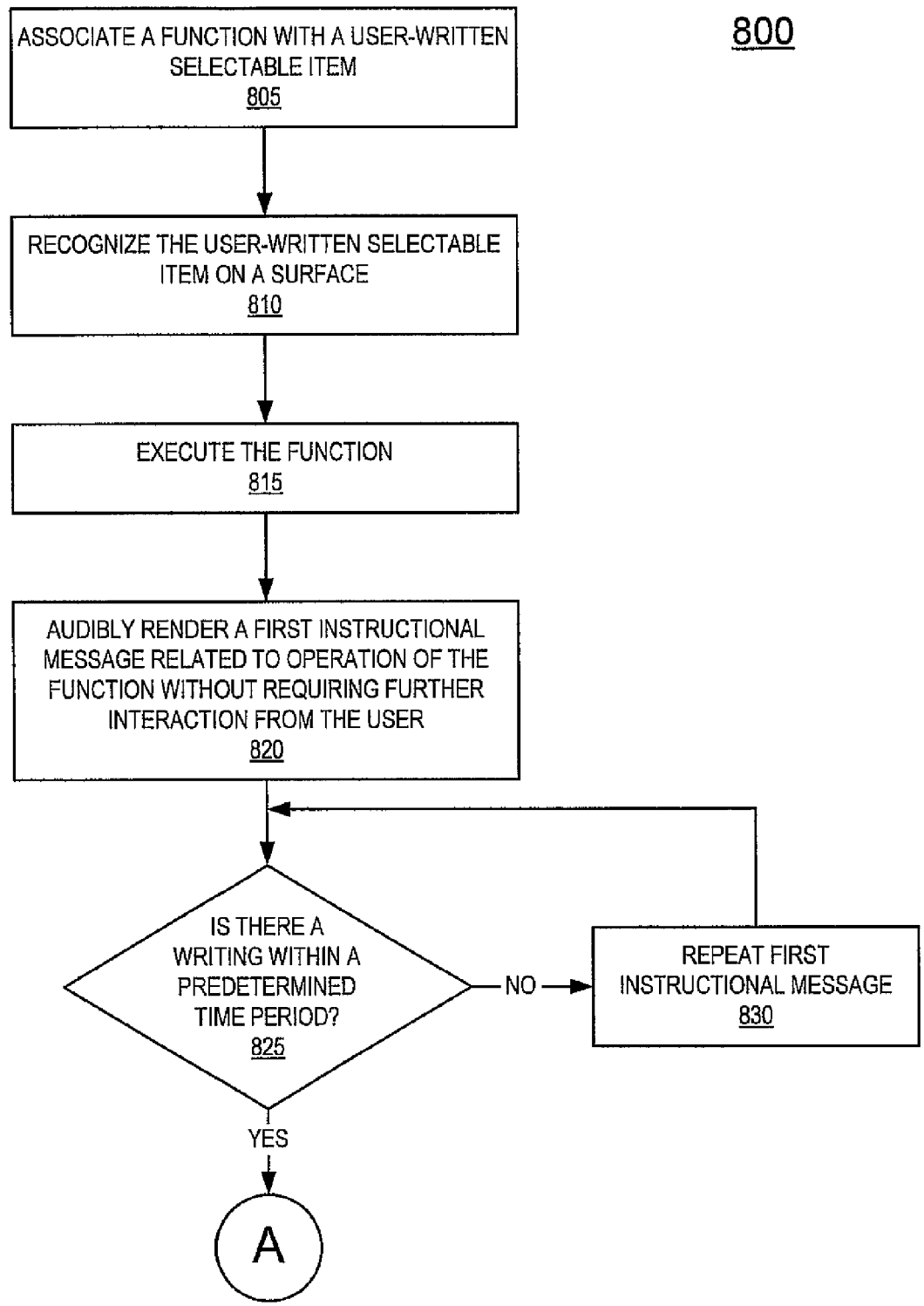
FIGS. 8A and 8B show a flowchart of a process for audibly instructing a user to interact with a function in accordance with one embodiment of the present invention.
Figure 8B:
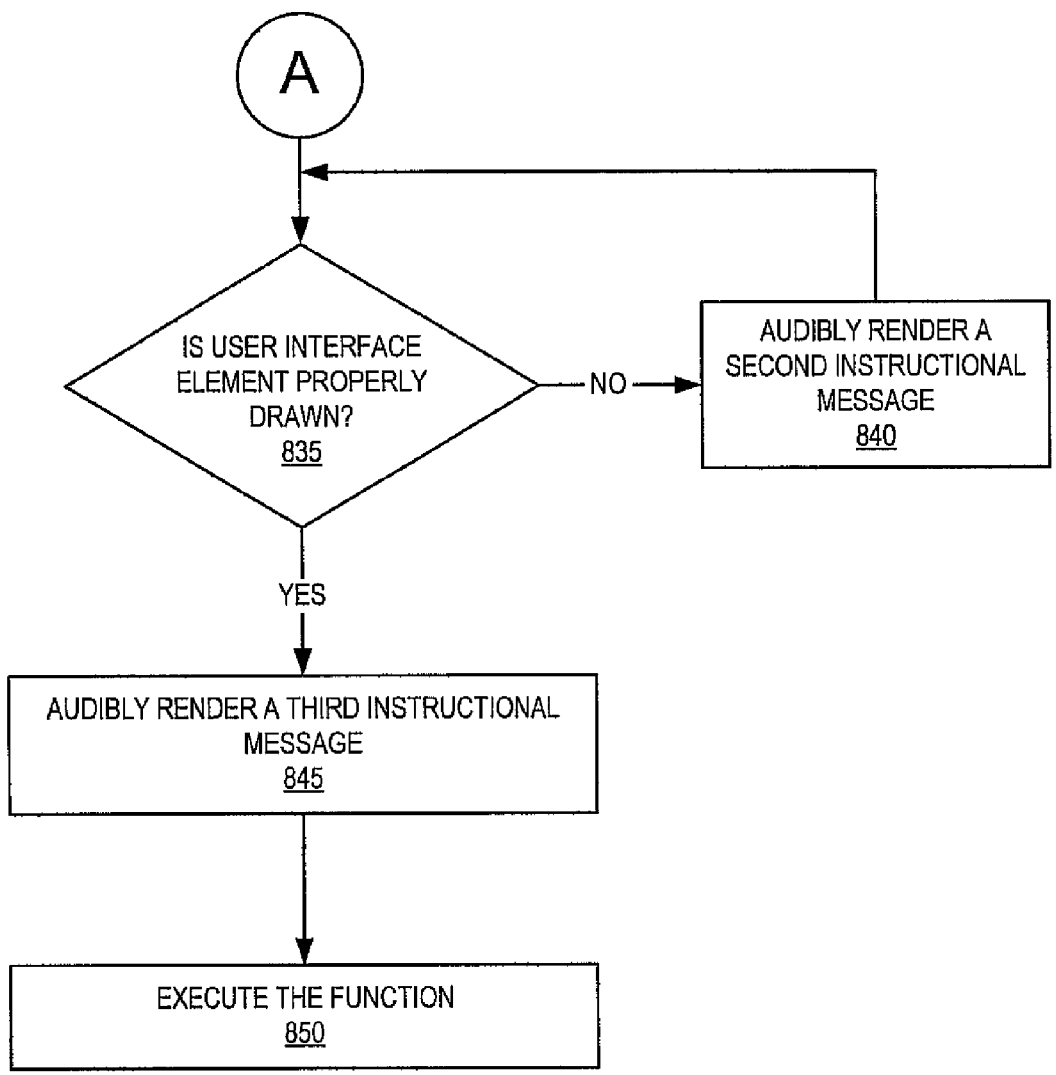

FIGS. 8A and 8B show a flowchart of the steps of a computer-implemented process 800 in accordance with one embodiment of the present invention. Process 800 depicts the basic operating steps of a process for audibly instructing a user to interact with a function as implemented by a device (e.g., interactive device 100 of FIG. 1) in accordance with one embodiment of the present invention as it interprets user input in the form of graphic elements, writing, marks, etc. and provides audible instruction regarding the requested functionality to the user.

Process 800 begins in step 805 of FIG. 8A, where the computer-implemented functionality of the interactive device 100 associates a function with a user-written selectable item. In one embodiment, interactive device 100 has stored therein a number of functions, such as executable application programs, menu item, an application option selector, or an instance of data, which are associated with respective user-written selectable items. For example, the letter C with a circle around it (e.g., user-written selectable item 244 of FIG. 2C) may be associated with a calculator function.

At step 810, the interactive device recognizes the user-written selectable item written on a surface. A user creates the user-written selectable item. In one embodiment, the user-written selectable item is recognized by optically recording positions of writing element 118 using optical detector 120. Pen device 100 performs image recognition of the positions to recognize the user-written selectable item. In one embodiment, the recognition of the user-written selectable item is performed in response to detecting a termination event indicating that the user-written selectable item is complete. When the user is done writing the user-written selectable item, the interactive device 100 recognizes the fact that the user is finished by, for example, recognizing the inactivity (e.g., the user is no longer writing) as a data entry termination event. In this manner, a "timeout" mechanism can be used to recognize the end of data entry. Another termination event could be a user completing the circle around the letter or letters. Additional examples of termination events are described in the commonly assigned U.S. patent application Ser. No. 11/035, 003 filed Jan. 12, 2005, by James Marggraff et al., entitled "TERMINATION EVENTS," which is incorporated herein in its entirety.

In one embodiment, as shown at step 815, the function is executed without requiring a user to draw any auxiliary writing (e.g., a checkmark) on the surface. For example, where the function is a time function, once the user-written selectable item associated with the time function is recognized, the time function is immediately executed. In the case of a time function, the current time may be audibly rendered. It should be appreciated that step 815 is optional, and that the function need not be executed at this point in process 800.

At step 820, in response to recognizing the user-written selectable item, a first instructional message related to the operation of the associated function is audibly rendered without requiring further interaction from the user (e.g., without requiring a user to draw any auxiliary writing such as a checkmark) on the surface. In one embodiment, the first instructional message directs the user to draw at least one user interface element that enables the user to interact with the function. For example, with reference to FIG. 2C, in response to recognizing user-written selectable item 244, an instructional message directing a user to draw a box within which to draw a calculator is audibly rendered. In another example, with reference to FIG. 2D, in response to recognizing user-written selectable item 254, an instructional message directing a user to draw two horizontal lines is audibly rendered At step 825, it is determined whether a writing (e.g., a user interface element) has been drawn on the surface within a predetermined time (e.g., three seconds or five seconds) since audibly rendering the first instructional message. If no writing has been drawn within the predetermined time period, as shown at step 830, the first instructional message is repeated. Alternatively, if a writing has been drawn on the surface, process 800 proceeds to step 835 of FIG. 8B.

With reference now to FIG. 8B, at step 835 it is determined whether the user interface element has been properly drawn on the surface, in accordance with an embodiment of the present invention. For example, consider the calculator function described above. The user is initially directed to draw a box. Once a writing is detected on the surface, interactive device 100 will determine whether it is properly drawn. In the case of the calculator function, interactive device 100 will determine whether the user drew a box and whether that box is of the appropriate dimensions within which to draw additional user interface elements (e.g., numbers and operands).

If the user has not properly drawn the user interface element, as shown at step 840, a second instructional message including a hint about a manner in which the user should properly draw the user interface element is audibly rendered. For example, if it is determined that the user has drawn a box in which a calculator is to be drawn, but that the box is too small to fit all necessary information, the second instructional message may direct the user to draw a bigger box. In another example, consider a user that is using the musical keyboard function and is initially directed to draw two horizontal lines. If it is determined that the lines drawn by the user are not horizontal, (e.g. vertical or diagonal), the second instructional message may inform the user that horizontal lines are side-to-side.

Once it is determined that the user interface element is properly drawn, process 800 proceeds to step 845 and/or step 850. It should be appreciated that steps 845 and 850 are optional, and that one or both of these steps can be implemented.

At step 845, a third instructional message is rendered. For example, the user may be directed to write the numbers zero through nine in the calculator box. It should be appreciated that process 800 may then perform steps similar to those described in steps 825 through 840 to determine whether a writing has been written and whether that writing is proper. It should also be appreciated that any number of instructional messages may be audibly rendered to direct a user to draw user interface elements. Depending on the complexity of the user interface elements, a number of instructional messages may be necessary to accurately describe to a user how to draw a particular user interface element. For example, a musical keyboard with sharps and flats keys, as well as a volume control and a tempo control, may require more instructional messages than a musical keyboard that does not include sharps and flats keys, a volume control or a tempo control.

At step 850, the function is executed. For example, once the calculator is drawn, the user may then interact with the calculator to perform mathematical calculations. In one embodiment, a message is audibly rendered informing the user that the calculator is ready for use.

In this manner, embodiments of the present invention provide a user with instructional messages regarding the use of a selected function. In particular, the instructional messages are audibly rendered prior to executing the function and without requiring additional user interaction with the surface. For example, in order for a user to utilize a calculator, the calculator must first be drawn. The user is directed to draw the necessary user interface elements prior to executing the calculator function.

Figure 9:
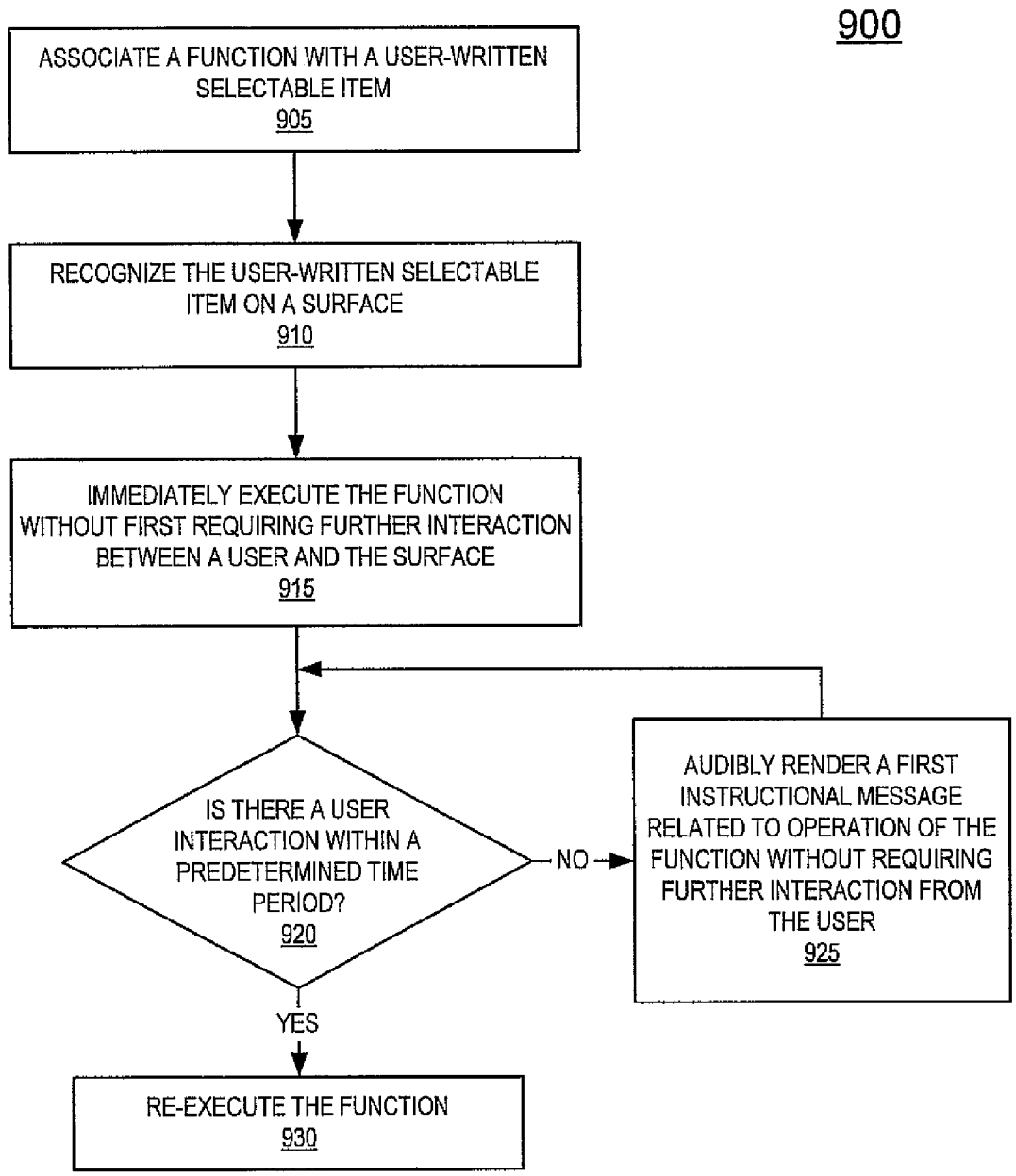
FIG. 9 shows a flowchart of a process for automatically executing a function in accordance with one embodiment of the present invention.

FIG. 9 shows a flowchart of the steps of a computer-implemented process 900 in accordance with one embodiment of the present invention. Process 900 depicts the basic operating steps of a process for automatically executing a function as implemented by a device (e.g., interactive device 100 of FIG. 1) in accordance with one embodiment of the present invention as it interprets user input in the form of graphic elements, writing, marks, etc. and provides audible instruction regarding the requested functionality to the user.

Process 900 begins in step 905, where the computer-implemented functionality of the interactive device 100 associates a function with a user-written selectable item. In one embodiment, interactive device 100 has stored therein a number of functions, such as executable application programs, menu item, an application option selector, or an instance of data, which are associated with respective user-written selectable items. For example, the letter T with a circle around it (e.g., user-written selectable item 242 of FIG. 2C) may be associated with a time function.

At step 910, the interactive device recognizes the user-written selectable item written on a surface. A user creates the user-written selectable item. In one embodiment, the user-written selectable item is recognized by optically recording positions of writing element 118 using optical detector 120. Pen device 100 performs image recognition of the positions to recognize the user-written selectable item. In one embodiment, the recognition of the user-written selectable-item is performed in response to detecting a termination event indicating that the user-written selectable item is complete. When the user is done writing the user-written selectable item, the interactive device 100 recognizes the fact that the user is finished by, for example, recognizing the inactivity (e.g., the user is no longer writing) as a data entry termination event. In this manner, a "timeout" mechanism can be used to recognize the end of data entry. Another termination event could be a user completing the circle around the letter or letters. Additional examples of termination events are described in the commonly assigned U.S. patent application Ser. No. 11/035,003 filed Jan. 12, 2005, by James Marggraff et al., entitled "TERMINATION EVENTS," which is incorporated herein in its entirety.

At step 915, the function is immediately executed without requiring further interaction between the user and the surface (e.g., without requiring a user to draw any auxiliary writing such as a checkmark). For example, where the function is a time function, once the user-written selectable item associated with the time function is recognized, the time function is immediately executed. In the case of a time function, the current time may also be audibly rendered.

At step 920, it is determined whether there is user interaction with the user-written selectable item within a predetermined time (e.g., three seconds or five seconds) since the function has been executed. If there is no user interaction within the predetermined time period, as shown at step 925, a first instructional message related to the operation of the associated function is audibly rendered without requiring further interaction from the user. For example, where the function is a time function, an instructional message informing a user that interacting with the associated user-written selectable item would case the time to be repeated may be audibly rendered.

Alternatively, if it is determined that there is user interaction with the user-written selectable item within a predetermined time, as shown at step 930, the function is re-executed. For example, with reference to FIG. 2C, if a user interacts (e.g., taps) user-written selectable item 242, the current time is audibly rendered. In one embodiment, the time function toggles between the current time and the current date for each interaction with user-written selectable item 242. In this manner, embodiments of the present invention provide a user with immediate execution of a selected function. In particular, the function is executed without requiring additional user interaction with the surface. Accordingly, the user is provided with an efficient user interface by which functions that provide certain types of information may be immediately executed.

Although embodiments of the present invention have been described in the context of using surfaces encoded with markings in order to determine location of the pen device, it should be noted that embodiments of the present invention are suitable for use with pen devices that determine location using other means that do not require encoded surfaces. For example, in one embodiment, a pen device can incorporate one or more position location mechanisms such as, for example, motion sensors, gyroscopes, etc., and can be configured to accurately store a precise location of a given surface (e.g., a sheet of paper). The precise location of the surface can be stored by, for example, sequentially touching opposite corners of the surface (e.g., a rectangular sheet of paper). The pen device would then recognize the location of graphic elements written by the user on the surface by comparing the stored precise location of the surface with the results of its location determination means.

Various embodiments of the invention, a method for audibly instructing a user to interact with a function, are thus described. While the present invention has been described in particular embodiments, it should be appreciated that the invention should not be construed as limited by such embodiments, but rather construed according to the below claims.

What is claimed is:

1. A method for audibly instructing a user to interact with a function, said method comprising:
    associating a function with a user-written selectable item;
    at a pen computer, recognizing said user-written selectable item on a surface, subsequent to writing said user-written selectable item, by determining that said pen computer is disposed on said user-written selectable item; and
    in response to said recognizing said user-written selectable item, audibly rendering a first instructional message related to the operation of said function without requiring further interaction from said user,
    wherein said audibly rendering said first instructional message is performed by an audio output device of said pen computer.

2. The method as recited in claim 1 wherein said first instructional message directs said user to draw at least one user interface element that enables said user to interface with said function.

3. The method as recited in claim 2 further comprising: determining whether said user interface element has been properly drawn on said surface; and provided said user interface element has not been properly drawn on said surface, audibly rendering a second instructional message comprising a hint about a manner in which said user should properly draw said user interface element.

4. The method as recited in claim 3 further comprising, provided said user interface element has been properly drawn, audibly rendering a third instructional message.

5. The method as recited in claim 3 further comprising, provided said user interface element has been properly drawn, executing said function.

6. The method as recited in claim 2 further comprising:
determining whether a writing has been drawn on said surface within a predetermined time period since said audibly rendering said first instructional message; and provided no writing has been drawn on said surface within said predetermined time period, repeating said first instructional message.

7. The method as recited in claim 1 further comprising, in response to a user interaction with said user-written selectable item, repeating said first instructional message.

8. The method as recited in claim 1 further comprising executing said function prior to audibly rendering said first instructional message.

9. The method as recited in claim 1 wherein said recognizing said user-written selectable item is performed in response to detecting a termination event indicating that said user-written selectable item is complete.

10. The method as recited in claim 1 wherein said recognizing said user-written selectable item comprises: optically recording positions of the tip of a pen computer; and performing image recognition of said positions to recognize said user-written selectable item.

11. A computer-usable medium having computer-readable program code embodied therein for causing a computer system to perform a method for audibly instructing a user to interact with a function, said method comprising:
associating a function with a user-written selectable item;
at a pen computer, recognizing said user-written selectable item on a surface; and
in response to said recognizing said user-written selectable item, audibly rendering a first instructional message related to the operation of said function without requiring further interaction from said user,
wherein said audibly rendering said first instructional message is performed by an audio output device of said pen computer.

12. The computer-usable medium as recited in claim 11 wherein said first instructional message directs said user to draw at least one user interface element that enables said user to interface with said function.

13. The computer-usable medium as recited in claim 12, wherein said method further comprises: determining whether a writing has been drawn on said surface within a predetermined time period since said audibly rendering said first instructional message; and provided no writing has been drawn on said surface within said predetermined time period, repeating said first instructional message.

14. The computer-usable medium as recited in claim 12, wherein said method further comprises: determining whether said user interface element has been properly drawn on said surface; and provided said user interface element has not been properly drawn on said surface, audibly rendering a second instructional message comprising a hint about a manner in which said user should properly draw said user interface element.

15. The computer-usable medium as recited in claim 14, wherein said method further comprises, provided said user interface element has been properly drawn, audibly rendering a third instructional message.

16. The computer-usable medium as recited in claim 14, wherein said method further comprises, provided said user interface element has been properly drawn, executing said function.

17. The computer-usable medium as recited in claim 11 wherein said method further comprises, in response to a user interaction with said user-written selectable item, repeating said first instructional message.

18. The computer-usable medium as recited in claim 11 wherein said method further comprises executing said function prior to audibly rendering said first instructional message.

19. The computer-usable medium as recited in claim 11 wherein said recognizing said user-written selectable item is performed in response to detecting a termination event indicating that said user-written selectable item is complete.

20. The computer-usable medium as recited in claim 11 wherein said recognizing said user-written selectable item comprises: optically recording positions of the tip of a pen computer; and performing image recognition of said positions to recognize said user-written selectable item.

21. An interactive device comprising:
a bus;
an audio output device coupled to said bus;
a writing element for allowing a user to write on a writable surface;
an optical detector coupled to said bus for detecting positions of said writing element with respect to said writable surface;
a processor coupled to said bus; and
a memory unit coupled to said bus, said memory storing instructions that when executed cause said processor to implement a method for audibly instructing a user to interact with a function, said method comprising:
associating a function with a user-written selectable item;
recognizing said user-written selectable item on said writable surface;
and in response to said recognizing said user-written selectable item, audibly rendering a first instructional message related to the operation of said function without requiring further interaction from said user, wherein said first instructional message directs said user to draw at least one user interface element that enables said user to interface with said function;
determining whether said user interface element has been properly drawn on said surface;
provided said user interface element has not been properly drawn on said surface, audibly rendering a second instructional message comprising a hint about a manner in which said user should properly draw said user interface element; and
provided said user interface element has been properly drawn, executing said function.

22. The interactive device as recited in claim 21 wherein said method further comprises:
determining whether a writing has been drawn on said surface within a predetermined time period since said audibly rendering said first instructional message;
and provided no writing has been drawn on said surface within said predetermined time period, repeating said first instructional message.

23. The interactive device as recited in claim 21 wherein said method further comprises, provided said user interface element has been properly drawn, audibly rendering a third instructional message.

24. The interactive device as recited in claim 21 wherein said method further comprises, in response to a user interaction with said user-written selectable item, repeating said first instructional message.

25. The interactive device as recited in claim 21 wherein said method further comprises executing said function prior to audibly rendering said first instructional message.

26. The interactive device as recited in claim 21 wherein said recognizing said user-written selectable item is performed in response to detecting a termination event indicating that said user-written selectable item is complete.

27. The interactive device as recited in claim 21 wherein said recognizing said user-written selectable item comprises:
   optically recording positions of a tip of said interactive device on said writable surface using optical detector; and
   performing image recognition of said positions to recognize said user-written selectable item.

28. The interactive device as recited in claim 21 wherein said audibly rendering said first instructional message is performed by said audio output device.

* * * * *